(12) United States Patent
Hooper et al.

(10) Patent No.: US 7,588,749 B2
(45) Date of Patent: Sep. 15, 2009

(54) APPARATUS, METHOD AND SYSTEM FOR DELIVERING OXYGEN-OZONE

(75) Inventors: David M. Hooper, Austin, TX (US); Thomas Foster, Boulder, CO (US); Noel Henson, Valley, WA (US)

(73) Assignee: Minimus Spine, Inc., Austin, TX (US)

( * ) Notice: Subject to any disclaimer, the term of this patent is extended or adjusted under 35 U.S.C. 154(b) by 314 days.

(21) Appl. No.: 11/727,978

(22) Filed: Mar. 29, 2007

(65) Prior Publication Data

US 2008/0241052 A1 Oct. 2, 2008

(51) Int. Cl.
*C01B 13/10* (2006.01)
*B01D 53/04* (2006.01)

(52) U.S. Cl. .................................................. 423/581

(58) Field of Classification Search ............... 95/95, 95/96, 98, 104, 105, 130, 148; 96/131; 128/204.18; 423/219, 579, 581; 422/186.07; 73/23.2; 210/760, 192; 204/157.5
See application file for complete search history.

(56) References Cited

U.S. PATENT DOCUMENTS

| | | | | |
|---|---|---|---|---|
| 3,150,070 A | * | 9/1964 | Ogawa ................. 422/186.15 |
| 4,477,264 A | * | 10/1984 | Kratz et al. ................... 95/103 |
| 4,604,279 A | * | 8/1986 | Leitzke et al. ............... 423/581 |
| 4,636,226 A | * | 1/1987 | Canfora ........................ 95/138 |
| 5,785,738 A | * | 7/1998 | Gastiger et al. ................ 95/12 |
| 5,888,271 A | * | 3/1999 | Tanimura et al. ............... 95/12 |
| 5,928,610 A | * | 7/1999 | Moran et al. ................. 422/120 |
| 6,273,935 B1 | * | 8/2001 | Shih et al. ........................ 95/8 |
| 6,916,359 B2 | * | 7/2005 | Jain ............................... 95/99 |
| 2003/0145727 A1 | * | 8/2003 | Murai .......................... 95/138 |
| 2003/0192431 A1 | * | 10/2003 | Lee et al. ....................... 95/96 |

* cited by examiner

*Primary Examiner*—Frank M Lawrence
(74) *Attorney, Agent, or Firm*—Maier & Maier, PLLC

(57) ABSTRACT

Apparatus, method and system for delivering a sterile unit dose of ozone that may include concentrating oxygen from air, which can include pressurizing at least one zeolite chamber having at least one zeolite material where the at least one zeolite material selectively adsorbs a substantial amount of nitrogen and not a substantial amount of oxygen. An oxygen-ozone cell may be filled with substantially concentrated oxygen from the at least one zeolite chamber. The oxygen-ozone cell may then be sequestered. The oxygen-ozone cell may be removed and may be engaged with an ozone conversion unit. The ozone conversion unit may charge the substantially concentrated oxygen generating a predetermined concentration of ozone. The oxygen-ozone cell may be disengaged from the ozone conversion unit.

10 Claims, 36 Drawing Sheets

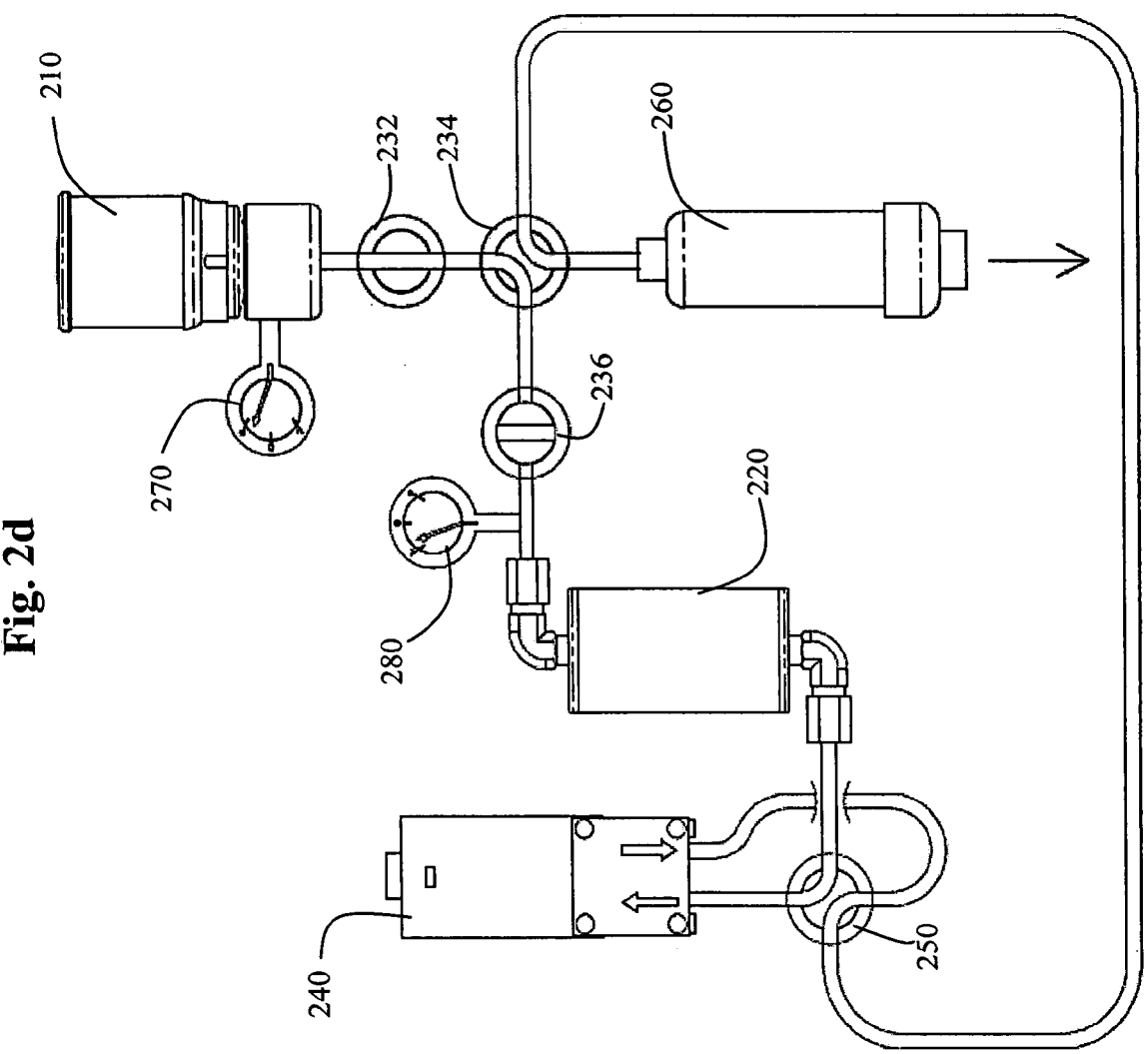

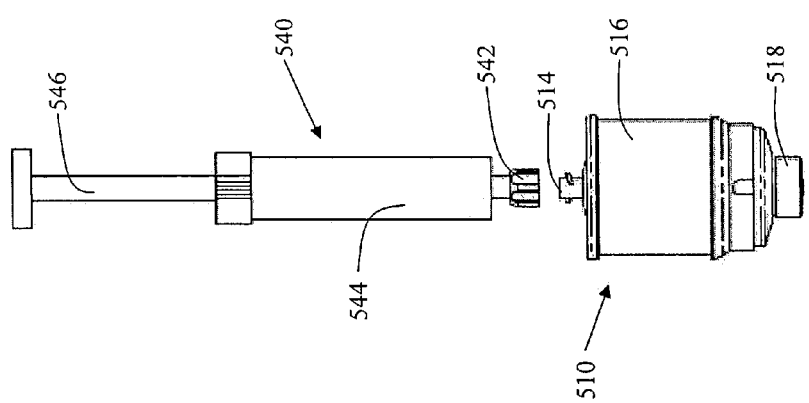

Fig. 6

| Dry Air Partial Volumes | | | Only O2 & Ar | All N2 removed | Only N2 Removed | | | | | | |
|---|---|---|---|---|---|---|---|---|---|---|---|
| Gas | Volume (ppmv) | Percent | | | 90% O2 | 91% O2 | 92% O2 | 93% O2 | 94% O2 | 95% O2 |
| Nitrogen (N2) | 780840 | 78.08400 | - | - | 5.81051 | 4.76396 | 3.71741 | 2.67086 | 1.62431 | 0.57776 |
| Oxygen (O2) | 209460 | 20.94600 | 95.73 | 95.55227 | 90.00000 | 91.00000 | 92.00000 | 93.00000 | 94.00000 | 95.00000 |
| Argon (Ar) | 9340 | 0.93400 | 4.27 | 4.26075 | 4.01317 | 4.05776 | 4.10235 | 4.14694 | 4.19153 | 4.23612 |
| Carbon dioxide (CO2) | 383 | 0.03830 | - | 0.17472 | 0.16457 | 0.16639 | 0.16822 | 0.17005 | 0.17188 | 0.17371 |
| Neon (Ne) | 18.18 | 0.00182 | - | 0.00829 | 0.00781 | 0.00790 | 0.00799 | 0.00807 | 0.00816 | 0.00825 |
| Helium (He) | 5.24 | 0.00052 | - | 0.00239 | 0.00225 | 0.00228 | 0.00230 | 0.00233 | 0.00235 | 0.00238 |
| Methane (CH4) | 1.745 | 0.00017 | - | 0.00080 | 0.00075 | 0.00076 | 0.00077 | 0.00077 | 0.00078 | 0.00079 |
| Krypton (Kr) | 1.14 | 0.00011 | - | 0.00052 | 0.00049 | 0.00050 | 0.00050 | 0.00051 | 0.00051 | 0.00052 |
| Hydrogen (H2) | 0.55 | 0.00006 | - | 0.00025 | 0.00024 | 0.00024 | 0.00024 | 0.00024 | 0.00025 | 0.00025 |
| nitrous oxide | 0.5 | 0.00005 | - | 0.00023 | 0.00021 | 0.00022 | 0.00022 | 0.00022 | 0.00022 | 0.00023 |

APPARATUS, METHOD AND SYSTEM FOR DELIVERING OXYGEN-OZONE

FIELD

The present invention generally relates to oxygen-ozone delivery systems. More particularly, the invention is directed to concentrating oxygen and converting a portion thereof to ozone to be delivered for therapeutic purposes.

BACKGROUND

Ozone is an unstable gas with a half-life of less than one hour at room temperature. The methods used to convert oxygen to ozone involve high voltage corona discharge or ultraviolet light. Ozone generators have been available for decades for industrial uses. Indeed, ozone is a powerful oxidizer and has been used for deodorizing air and purifying water. It is a known bactericide and viricide and recently has been used to sterilize medical instruments. Although, the cycle times are so long as to be impractical for many uses.

Ozone generators have been used for therapeutic applications for several years. Such applications include but are not limited to autohemotherapy, rectal insufflations, intradiscal injection, injection into knee and shoulder joints and full body exposure. Ozone has been used to treat diffuse bulging or contained herniation of the spinal disc.

Spinal discs are composed of a fibrous outer ring made of Type I collagen and a softer more flexible nucleus made of Type II collagen, proteoglycans and water. Patients with disc bulging or herniation suffer from pain caused by disc compression of the neurological elements, including the spinal cord, cauda equina and nerve roots. Intradiscal ozone treatment involves direct injection of a gaseous mixture of oxygen and ozone into the nucleus of the disc. Ozone releases water from the proteoglycans, reducing disc size and relieving compression of neurological elements. Some investigators believe that ozone stimulates anti-inflammatory mediators and initiates a healing response.

The mechanism of action and reported success rates of ozone treatment for spinal disc herniation are similar to that of the enzyme chymopapain. Chymopapain was first FDA-approved in 1983 and was widely used with a success rate of 65-85%. A small number of serious complications, including death and paralysis, caused the product to lose favor in the market and the product was eventually discontinued in the United States.

Ozone and chymopapain are two means of performing a chemical discectomy through a needle puncture. This minimally invasive approach may be preferred to surgical discectomy, which requires general anesthesia and direct access to the spinal disc.

Therapeutic ozone must be delivered practically immediately after being produced from oxygen. End-users of ozone such as doctors and health care professionals often procure medical grade oxygen from such sources as bulk tanks or a hopsital's wall supply of oxygen. Both of these sources are usually collect oxygen through cryogenic techniques. Although not previously used for ozone production, oxygen may also be concentrated from the ambient air using adsorption principles and zeolite materials. Existing medical ozone generators pass medical grade oxygen through an electric field or ultraviolet light. This process converts an amount of oxygen into ozone. A syringe is interfaced with the machine whereby ozone is withdrawn for subsequent injection therapy.

The preferred concentration of ozone for intradiscal injection is approximately 6%. The concentration of ozone is important for medical uses. If the concentration is too low the treatment will not be effective; if the concentration is too high detrimental effects may follow. As such, medical ozone generators must include a means for measuring the concentration of ozone. The elements necessary to create and measure ozone are sensitive and require maintenance to ensure precise and accurate operation.

Present ozone generators have basic means for controlling the concentration and delivery of ozone gas. Oxygen is generally passed through a machine containing permanent electrodes; the gas chambers of present generators are often permanent as well. Some generators include components that neutralize excess ozone. Other generators continuously vent ozone. Present ozone generators often include components for gas containment or pass oxygen through reaction chambers that are permanent and reusable, lending to sterility issues. Medical professionals often inject the gas through a bacterial filter to address such sterility issues.

The following patent publications illustrate and describe various background apparatuses, methods and/or systems related to generating ozone. US Patent Publication No. 2005/0074501 (Murphy et al.) teaches an apparatus, in an embodiment, including an ozone generator connected to a scavenger and an ozone administrator via network of tubing and valves. US Patent Publication No 2007/0025890 (Joshi et al.) teaches an apparatus that in various embodiments includes a syringe having a barrel and a plunger and having an ozone generator associated therewith. US Patent Publication No. 2003/0165411 (Engelhard) teaches an ozone generator that is a module having a threaded shaft serving as an electrode and which mechanically secures the various elements with one another. U.S. Pat. No. 6,270,733 (Rodden) teaches a tubular ozone generator comprising concentric inner tubular electrode/dielectric with inner electrode and outer tubular electrode with corona discharge zone between the inner tubular electrode/dielectric and outer tubular electrode. U.S. Pat. No. 6,110,431 (Dunder) teaches an ozone dispensing system comprising an ozone gas generating means, electrical means to control the concentration of ozone produced by said ozone gas generating means, means to control the concentration of ozone in preset dispensed volume, an oxygen supply and venting means disposed between said ozone gas generating means and said dispensing of said ozone, said venting means for continuous venting of said ozone. U.S. Pat. No. 5,052,382 (Wainwright) teaches an apparatus for the controlled generation and administration of ozone, which apparatus comprises a generator for generating ozone, a monitor for monitoring the ozone, a dosage device for providing a correct amount of ozone for administration, and a computer control device for controlling the operation of at least one of the generator, the monitor and the dosage device.

Similarly, the following patent publications illustrate and describe various background apparatuses, methods and/or systems for concentrating oxygen. U.S. Pat. No. 7,121,276 (Jagger et al.) teaches an oxygen separator, for separating oxygen from ambient air utilizing a vacuum swing adsorption process, having a mass of less than 2.3 kg. U.S. Pat. No. 6,949,133 (McCombs et al.) teaches a compact and highly portable combination pressure swing adsorption apparatus and product gas conservation device for medical use, to produce efficiently a gas with a high concentration of oxygen and to deliver the oxygen concentrated gas to a user at selectable times and in selectable doses. U.S. Pat. No. 6,520,176 (Dubois et al.) teaches an oxygen concentrator portable by a patient, permitting producing a flow of gas containing 50% to 95% of oxygen from air, comprising air compression device, elements for gas separation by adsorption with pressure variations, and electrical energy storage unit. U.S. Pat. No. 5,766,310 (Cramer) teaches a single stage secondary oxygen concentrator for receiving a gas mixture from a first stage oxygen concentrator and a method of use therefore.

SUMMARY

In accordance with at least one exemplary embodiment of the invention, an apparatus, system and method for concentrating oxygen from air is disclosed and may include at least one zeolite chamber having at least one zeolite material selected for its nitrogen adsorption properties. The exemplary embodiment may also include a pump in fluid communication with the at least one zeolite chamber where the pump is configurable to pull air from ambient air existing in the surrounding environment or an external air source. A cell chamber may be in valvably-controlled fluid communication with the at least one zeolite chamber.

A further exemplary embodiment may include concentrating oxygen from air, which can include pressurizing at least one zeolite chamber having at least one zeolite material where the at least one zeolite material selectively sorts nitrogen from oxygen. An oxygen-ozone cell may be filled with substantially concentrated oxygen from the at least one zeolite chamber. The oxygen-ozone cell may then be sequestered.

Yet another exemplary embodiment is directed to delivering a substantially sterile dose of oxygen-ozone that may include providing an oxygen-ozone cell having an inner chamber, an adaptor and a cap for the adaptor. The oxygen-ozone cell may be filled with substantially concentrated oxygen purified from air and may be engaged within an ozone conversion unit. The ozone conversion unit may charge the substantially concentrated oxygen, thus, generating a predetermined concentration of ozone. The oxygen-ozone cell may be disengaged from the ozone conversion unit for use.

BRIEF DESCRIPTION OF THE DRAWINGS

Further advantages of embodiments of the present invention will be apparent from the following detailed description of the preferred embodiments thereof, which description should be considered in conjunction with the accompanying drawings, wherein:

FIGS. 2*a-g* are exemplary schematics showing a two-pass single stage embodiment.

FIGS. 5*a-i* are exemplary schematics showing an embodiment for providing substantially sterile gaseous fluids.

FIG. 6 is a table showing the volume of component gases found in ambient air as a function of removing amounts of nitrogen.

DETAILED DESCRIPTION

Figure 1A:
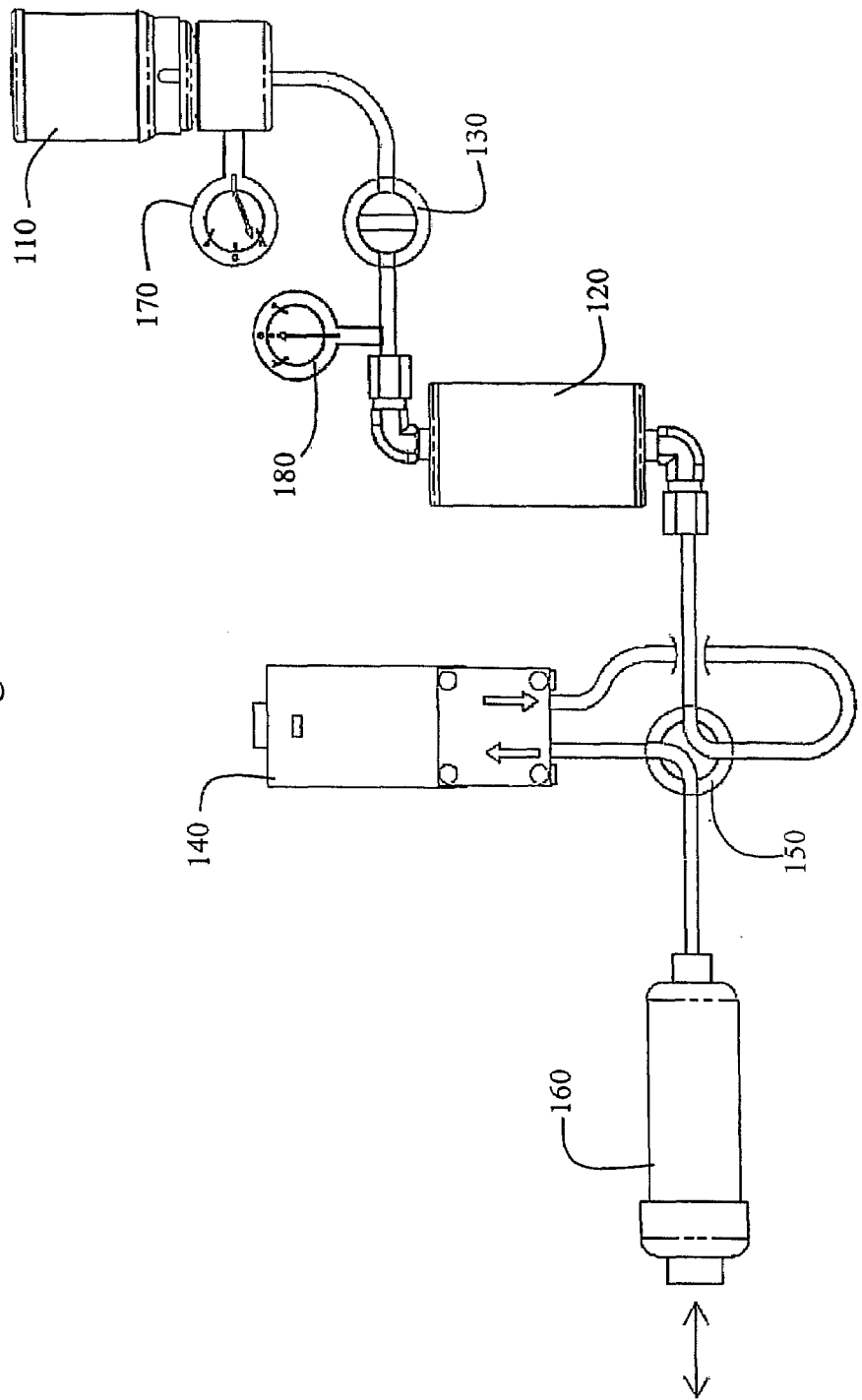
FIGS. 1*a-d* are exemplary schematics showing a one-pass single stage embodiment.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Embodiments of the present invention are directed to preparing and delivering therapeutic ozone as needed by combining ozone generation technologies with oxygen concentration technologies to produce a result that may be greater than anticipated by the novel and unobvious addition of these ideas alone. Using a zeolite(s) to concentrate oxygen from ambient air can have several benefits including generating ozone independent from a commercially supplied source of oxygen such as bottled oxygen or hospital line oxygen. Removing the necessity of a commercial oxygen supply may eliminate the risk of transporting flammable gas, may allow ozone to be produced in geographically remote areas without having to transport oxygen tanks and could potentially decrease costs by reducing the need for industrial gas.

Because nitrogen in the ambient air can react during ozone generation with the oxygen and water in the ambient air to produce toxic substances (nitrogen oxides and nitric acid), medical grade oxygen may have been considered necessary or at least a preferred source of oxygen. Embodiments of the present invention can overcome this by relying on selective adsorption of nitrogen from compressed/pressurized air subject to zeolite material(s). Removal of all nitrogen can result in a gaseous mixture of approximately 95% oxygen and 5% argon by volume. FIG. 6 shows an exemplary table indicating the volume of nitrogen and other components found in ambient air as a function of concentrating oxygen to a specific volume. These exemplary values are prophetic (i.e. are not the results of testing with embodiments of the present disclosure). As argon is inert and non-toxic, about 5% argon by volume may be acceptable in the oxygen-concentrated gaseous source for creating sufficient levels of ozone without harmful amounts of toxicity. The oxygen concentration of the gaseous mixture can be further increased by using at least one carbon filter bed/chamber to remove the argon as will be known and appreciated by one having ordinary skill in the art. This may further increase the efficiency of ozone generation.

Because nitrogen oxides are potentially toxic, it may be important to ensure that there is minimal nitrogen in the feed gas prior to ionization or, alternatively or in combination, to ensure that there are minimal amounts of nitrogen oxides in the "charged" ozone cell, for example, by measuring the presence of nitrogen oxides. For instance, embodiments can incorporate an optical system to detect the amount of nitrogen dioxide in the finished ozone-oxygen mixture. The optical system may include a light source and photodetector that can be used to measure the amount of nitrogen dioxide in the finished gaseous product to confirm that a toxic amount of nitrogen dioxide is not present. As known in the art, conventional optical systems can measures nitrogen dioxide based upon nitrogen dioxide's absorption in the blue-green light spectrum. Nitrogen dioxide has a selective band in the range of about 400-550 nm. As a safety feature, if nitrogen dioxide is detected, the ozone dose should not be used and the system should be serviced or inspected.

Embodiments of the present invention for delivering a sterile and substantially pure dose of ozone and oxygen are disclosed. Exemplary embodiments may include an exemplary oxygen-ozone cell and an exemplary ozone conversion unit as described below. Although, other conventional and non-conventional oxygen-ozone cells and ozone conversion units will be recognized and known to one having ordinary skill in the art as being suitable for use with embodiments of the present invention. The exemplary oxygen-ozone cell may be sealed, containing therein a corona discharge assembly. Furthermore, the exemplary oxygen-ozone cell may be of a disposable or reprocessable nature and construction. For example, to permit one-time use before disposing or reprocessing. The exemplary ozone conversion unit may include an ozone UV measurement assembly, a data input mechanism such as a dial to allow the user to select a desired ozone concentration, and a data display to display input and output data such as desired concentrations and measurements. After oxygen-ozone cell is engaged to the ozone conversion unit, an ozone concentration may be selected and power applied to effect corona discharge and the resultant conversion of oxygen to the selected concentration of ozone. Oxygen-ozone cell may then be disengaged, thus allowing for oxygen and ozone mixture withdrawal. Embodiments may be employed in any of a variety of situations including, for example, the therapeutic treatment of humans or animals by way of injection.

An exemplary oxygen-ozone cell may have a variety of components, such as a casing, a corona discharge assembly, electrical contact points, a port and one-way valve and a key structure. The oxygen-ozone cell may be substantially airtight/sealed. An exemplary embodiment may include port and one-way valve for sealing, which may be constructed to reduce efflux of gas from the oxygen-ozone cell and allow influx of gas when actuated. This may be accomplished by a spring-valve mechanism. One exemplary embodiment which may be included within the port and one-way valve can be a series of valves to first allow a vacuum to be drawn and then to allow influx of oxygen. An exemplary series of valves may include a single valve with a first setting and a second setting at the center to form a Y-shaped configuration.

The casing may be constructed out of a material that allows for UV transmission, such as, but not limited to, acrylic, quartz or any other such material known to one having ordinary skill in the art to have substantially similar adsorption coefficients. This can allow passage of a UV beam through the gas so that the concentration of ozone can be measured.

The corona discharge assembly may be arranged within the casing and may comprise an outer electrode and an inner electrode. They may be arranged to create an electric field, the strength of which can be changed using appropriate dielectrics and voltage settings. In exemplary embodiments of the present invention, this can be accomplished by encasing the outer electrode in a dielectric material and incorporating an inner cylinder of dielectric materials encasing inner electrode. Such a configuration can have the advantage of shielding the electrodes from long-term oxygen exposure. In another exemplary embodiment, the outer electrode may be situated outside the oxygen-ozone cell and may further be situated in the ozone conversion unit. The corona discharge assembly may be arranged to accommodate axial passage of UV light; or an alternative embodiment, transverse passage of UV light. The corona discharge assembly may be connected to the electrical contact points. The electrical contact points may be arranged to interface with the exterior of the oxygen-ozone cell.

The ozone conversion unit may be used to convert an amount of oxygen contained in oxygen-ozone cell to ozone by facilitating power. Ozone conversion unit may include a high voltage transformer. In an exemplary embodiment, the high voltage transformer may have a potential difference of about 3-25 kV. The high voltage transformer may be connected to a power source and to another set of electrical contact points. In another exemplary embodiment, electrical contact points may be arranged to reversibly interface with the electrical contacts of the oxygen-ozone cell.

The ozone conversion unit may further include a dial, a UV measurement assembly, and a data display. The UV measurement assembly may include components relating to measurements using UV absorption techniques, whereby a beam is passed through the ozone and oxygen mixture to be received by a detector. Such a beam may have a wavelength within a range on the UV spectrum known to those skilled in the art to be absorbed by ozone such as ranges UV-A, UV-B, and UV-C; it may be preferable to use light emissions having wavelengths of about 253.7 nm, within the bounds of the UV-C range. In an exemplary embodiment, a mercury vapor lamp may be used to measure the concentration of ozone. An alternative exemplary embodiment may employ a UV light emitting diode or other instruments known to one having ordinary skill in UV absorption techniques. An exemplary detector may be a photodiode or other photo detecting instruments known to those having ordinary skill in the art. The dial may be used to regulate or input a desired ozone concentration. An exemplary therapeutically effective concentration of ozone is 6% or less by volume. The oxygen-ozone cell may be constructed to be received by the ozone conversion unit in such a way that orients the oxygen-ozone cell for successful UV measurement; this may be achieved by including a lock on the ozone conversion unit capable of receiving key structure of the oxygen-ozone cell.

In an exemplary embodiment, the electrical contact points may be situated to interface with the interior of a receptacle formed in the ozone conversion unit that is capable of receiving the oxygen-ozone cell. The UV measurement assembly may be arranged to orient a UV measurement beam axially through and along the receptacle to be received by a UV detector. In an alternative embodiment, the UV measurement assembly may be arranged to orient the UV measurement beam through receptacle transversely. A further exemplary embodiment may include a door to be closed upon an engaged oxygen-ozone cell, thereby reducing ambient light from infiltrating the receptacle and interfering with UV detector.

The data display may be used to display measurement data collected by UV measurement assembly, indicate power status, or convey other relevant information such as input data or to confirm engagement of the oxygen-ozone cell within the ozone conversion unit and operating pressures. The data display may be used to display any information or data that may be useful to one having ordinary skill in the art. The ozone conversion unit may be constructed to receive power, which can be made to pass through the high voltage transformer, and both sets of electrical contact points, thereby causing the corona discharge assembly to act upon the oxygen contained by the oxygen-ozone cell and effect the selected concentration of ozone.

The exemplary ozone conversion unit may also be constructed to detect nitrogen oxides (NOx). If an oxygen-ozone cell is contaminated with nitrogen, for example, due to ingress of air from such causes as a leak within the cell or improper functioning of a filling apparatus and system, then NOx will be produced by charging with the ozone conversion unit. Absorption techniques can be used to indirectly detect nitrogen ingress into the cell prior to charging. While nitrogen itself is optically transparent, $NO_x$ molecules, which will be created from the ionization of nitrogen and oxygen, absorb light at various frequencies between 227 and 550 nm. Many $NO_x$ bands overlap with that of ozone making it difficult to isolate these oxides. However, NO$_2$ has absorption bands (400-550 nm) that are distinct from ozone (253.7 nm) making it well suited to detect nitrogen ingress and formation of NO$_x$'s. Additionally, an exemplary ozone conversion unit or an exemplary oxygen-ozone cell (that may be under negative or positive pressure) may be constructed to measure leaks within the cell because at least one visual indicator or sensor for measuring changes in pressure known to those having ordinary skill in the art may be suitable placed for such a purpose. Moreover, the dialectric property of gases may provide another way to measure the amount of nitrogen potentially within the cell. Oxygen and nitrogen have different dialectic constants and may be detected based on this difference.

Referring generally to FIGS. 1a-d, an exemplary one-pass single stage embodiment for filling an oxygen-ozone cell with substantially concentrated oxygen is shown. An exemplary apparatus, system and method may include oxygen-ozone cell 110 configured for fluid communication with zeolite chamber 120 interspersed by two-way valve 130 for establishing and impeding communication. Oxygen-ozone cell (cell chamber) 110 may be provided for use already held under vacuum. Nitrogen may also have been previously purged/evacuated from oxygen-ozone cell 110, for example, by previously filling cell 110 with substantially pure oxygen and applying a vacuum to it. Of course, the amount of nitrogen may be reduced with each successive purge cycle. Thus, nitrogen residue may be reduced before the cell is attached to embodiments (see, e.g., FIGS. 1a-4i) described below. Pump 140 may be configured to allow for fluid communication with zeolite chamber 120 (and two-way valve-controlled fluid communication with oxygen-ozone cell 110) and an air source by way of, for example, valve 150 or any other pump component, device or mechanism known to one having ordinary skill in the art for providing bidirectional functionality to a pump (the pump itself may not necessarily be bidirectional, rather the valve(s) can make it effectively so.). Optionally, entering air may be passed through desiccant chamber 160 to remove moisture. Desiccant chamber 160 may be in bidirectional fluid communication with pump 140 by way of valve 150, which may be a four-way valve. Also, optionally, pressure gages such as gages 170 and 180 may be included with exemplary embodiments for measuring and/or controlling the pressure within oxygen-ozone cell 110 and zeolite chamber 120, respectively. In particular, pressure gage 170 can determine if oxygen-ozone cell 110 is provided under vacuum. If not, it may have already been used and, thus, may not be reused at a user's discretion. Furthermore, as a potential safety precaution, embodiments may be configured so as to not allow filling of cell 110 if not under vacuum, for example, as determined by pressure gage 170. Alternatively, any other means for measuring and/or controlling the pressure within oxygen-ozone cell 110 and zeolite chamber 120 known to one having ordinary skill in the art may be used. As well as any other means for shutting down embodiments in response to oxygen-ozone cell 110 not being under vacuum known to one having ordinary skill in the art may be used.

FIG. 1a schematically shows an exemplary one-pass single stage embodiment at an initial state. At initial state, oxygen-ozone cell 110 can be held under vacuum as represented in the schematic by pressure gage 170. For example, the pressure of oxygen-ozone cell 110 may be between about negative 6-18 psig, for instance, in one preferred embodiment, the pressure within oxygen-ozone cell 110 may be about −12 psig. The content, if any, of oxygen-ozone cell 110 may be primarily of atmospheric/ambient air or residual oxygen following at least one purge cycle. Valve 130 can be closed so as not to permit communication between cell 110 and zeolite chamber 120. At initial state, zeolite chamber 120 may be at about atmospheric pressure and pump 140 is off.

Figure 1B:
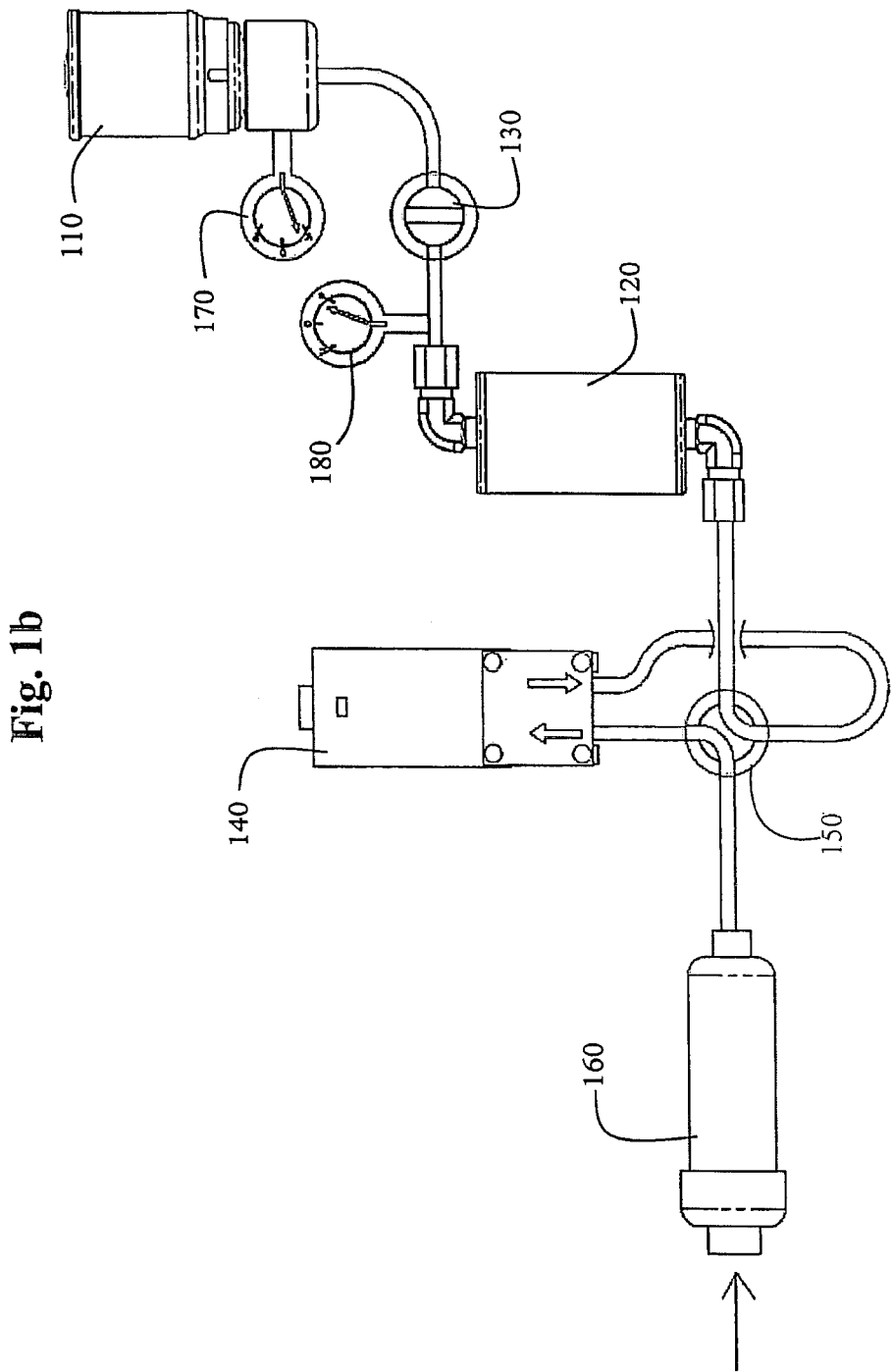

FIG. 1b depicts how an exemplary embodiment can concentrate (generate substantially more pure) oxygen by pressurizing zeolite chamber 120. Pump 140 is turned on and may pull air through desiccant chamber 160 and pump air into zeolite chamber 120 causing it to be pressurized. Zeolite chamber 120 has at least one zeolite acting as a molecular sieve for adsorbing (selectively sorting) at least a substantial amount of nitrogen (and may also adsorb other molecular components of air that are found in lesser concentrations) while not adsorbing at least a substantial portion of oxygen, thus, concentrating the oxygen (and may also concentrate other components such as argon) within zeolite chamber 120. As a result of pressurizing zeolite chamber 120 with substantially concentrated oxygen, the pressure in chamber 120 can be between about 11-33 psig, for example, in one preferred embodiment, the pressure may be about 22 psig.

Figure 1C:
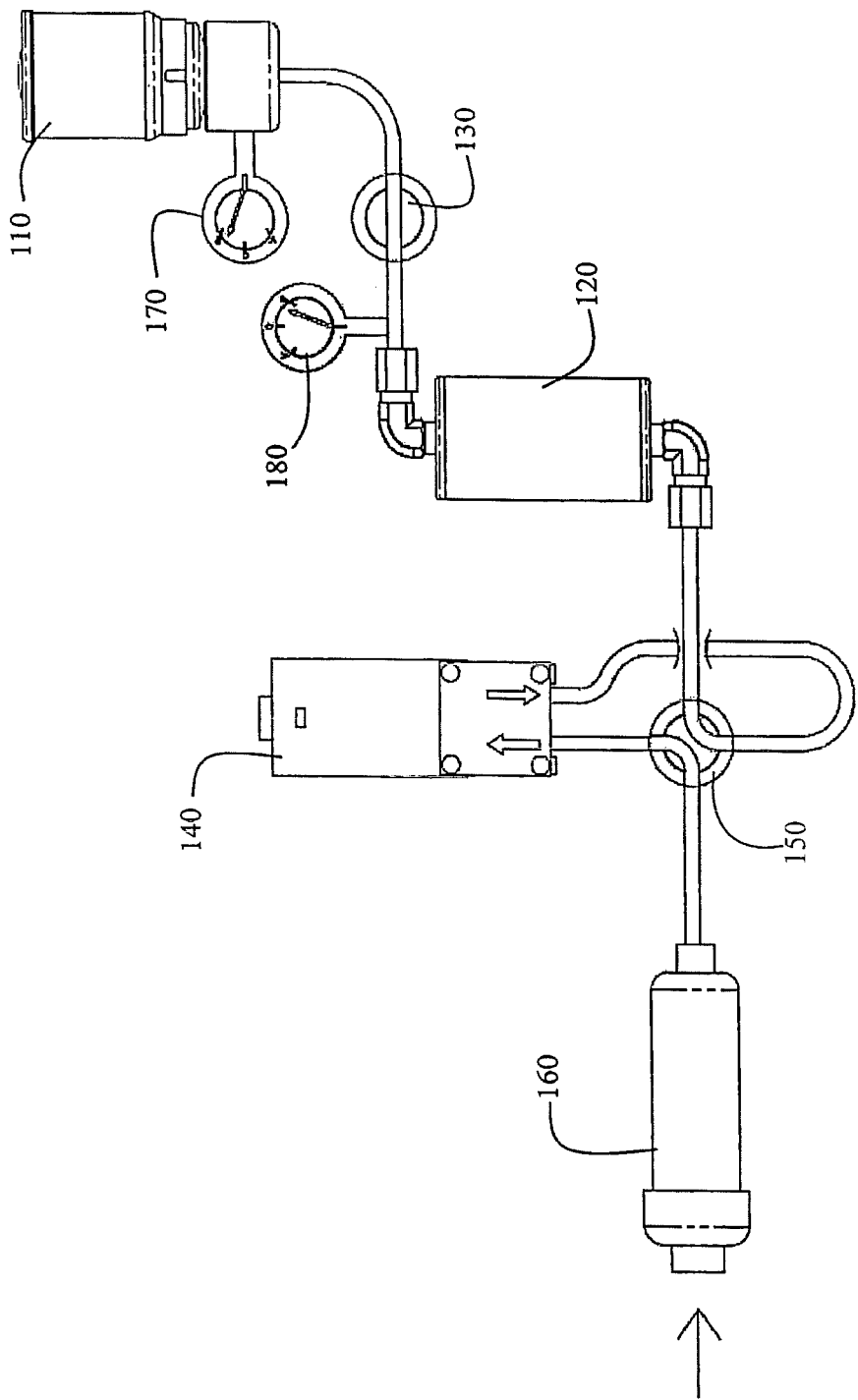

FIG. 1c schematically depicts how oxygen-ozone cell 110 is filled in an exemplary embodiment. Valve 130 can be opened so as to permit communication between cell 110 and zeolite chamber 120 where pump 140 may continue to pressurize zeolite chamber 120 maintaining concentrated oxygen in both cell 110 and zeolite chamber 120. As a result of this configuration, both zeolite chamber 120 and cell 110 may have concentrated oxygen that can be held at a pressure of between about 11-33 psig in each respective chamber, for example, in one preferred embodiment, the pressure may be maintained at about 22 psig in each chamber.

Figure 1D:
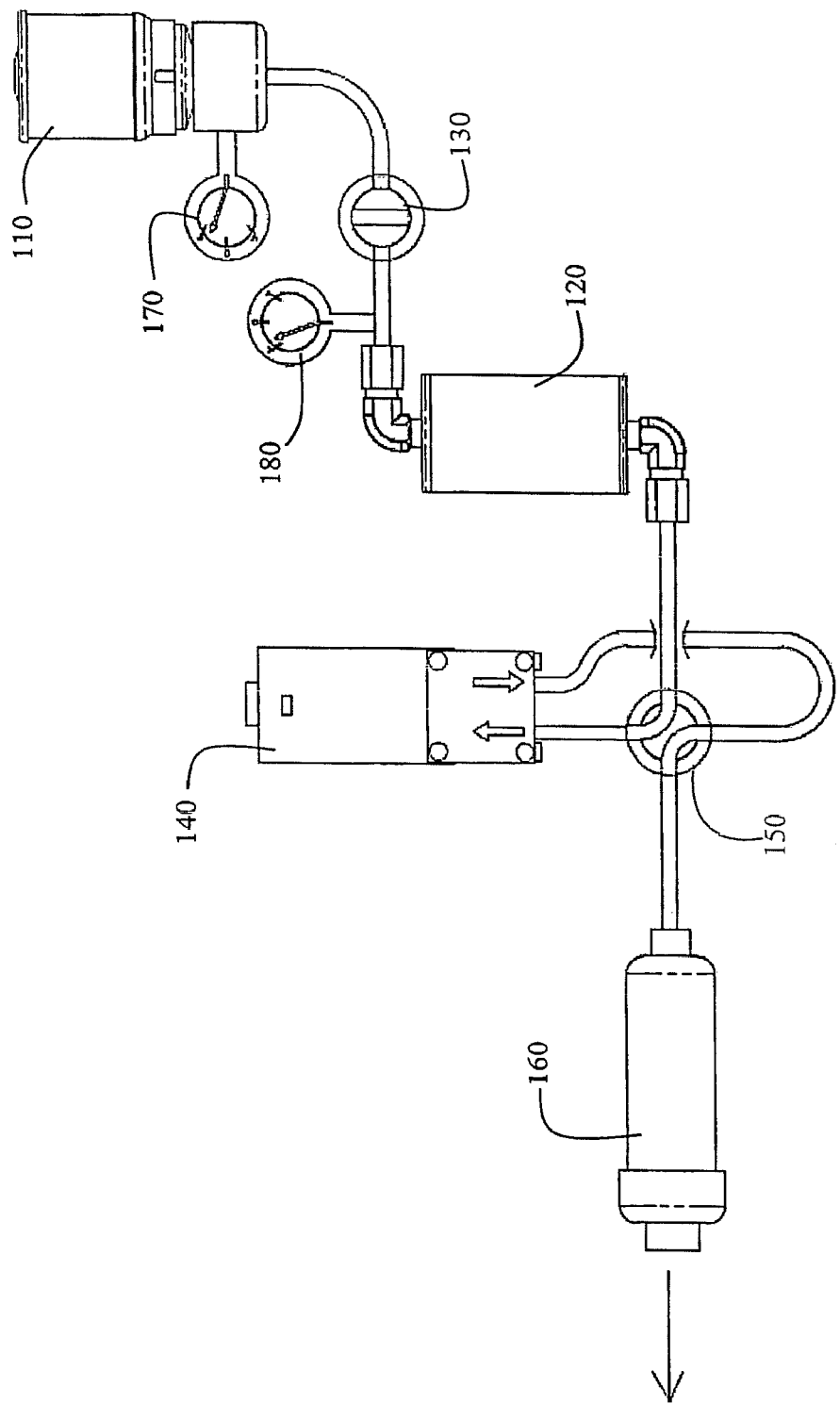

FIG. 1d shows an exemplary nitrogen purging (flushing) step for an exemplary embodiment. Valve 130 can be closed so as to not permit communication between oxygen-ozone cell 110 and zeolite chamber 120, thus, the embodiment may be said to sequester oxygen under pressure (of about 11-33 psig, preferably, about 22 psig) in cell 110. Pump 140 can be ran in the opposite direction, as schematically depicted by the orientation of valve 150, so as to pull, among other contents, nitrogen from zeolite chamber 120 (as well as from the apparatus and system as a whole) and pump nitrogen out, for instance, through desiccant chamber 160 into the surrounding environment as well as through any other exhaust mechanisms known to one having ordinary skill in the art. During this step, zeolite chamber 120 may be under vacuum (and its contents, if any, can be a mix of both oxygen and nitrogen), for example, with a pressure of about negative 4-12 psig, preferably, about −8 psig. Oxygen-ozone cell 110 may be detached and the oxygen therein may be of substantial purity as to be available for ozone conversion as needed, for example, for therapeutic purposes. If another evacuated oxygen-ozone cell replaces cell 110 and pump 140 is turned off, the embodiment may be returned to initial state as shown in FIG. 1a. Other embodiments having more than one zeolite chamber and/or steps for passing oxygen two or more times may increase oxygen purity (i.e. decrease nitrogen concentration), thus, increase the potential for use in therapeutic applications.

Referring generally to FIGS. 2a-g, an exemplary two-pass single stage embodiment for filling an oxygen-ozone cell with substantially concentrated oxygen is shown. The exemplary embodiment can include oxygen-ozone cell (cell chamber) 210 in valvably-controlled fluid communication with zeolite chamber 220 via, for example, two-way valve 232, four-way valve 234 and two-way valve 236. Also, oxygen-ozone cell 210 may be in valvably-controlled fluid communication directly with pump 240 via, for example, two-way valve 232, four-way valve 234 and four-way valve 250. Pump 240 may be in valvably-controlled fluid communication with desiccant chamber 260 via, for example, four-way valve 250 and four-way valve 234. Pump 240 also can be in valvably-controlled bidirectional fluid communication directly with zeolite chamber 220 via, for example, four-way valve 250. Optionally, pressure gages such as gages 270 and 280 may be included with exemplary embodiments for measuring and/or controlling the pressure within oxygen-ozone cell 210 and zeolite chamber 220, respectively.

Figure 2A:
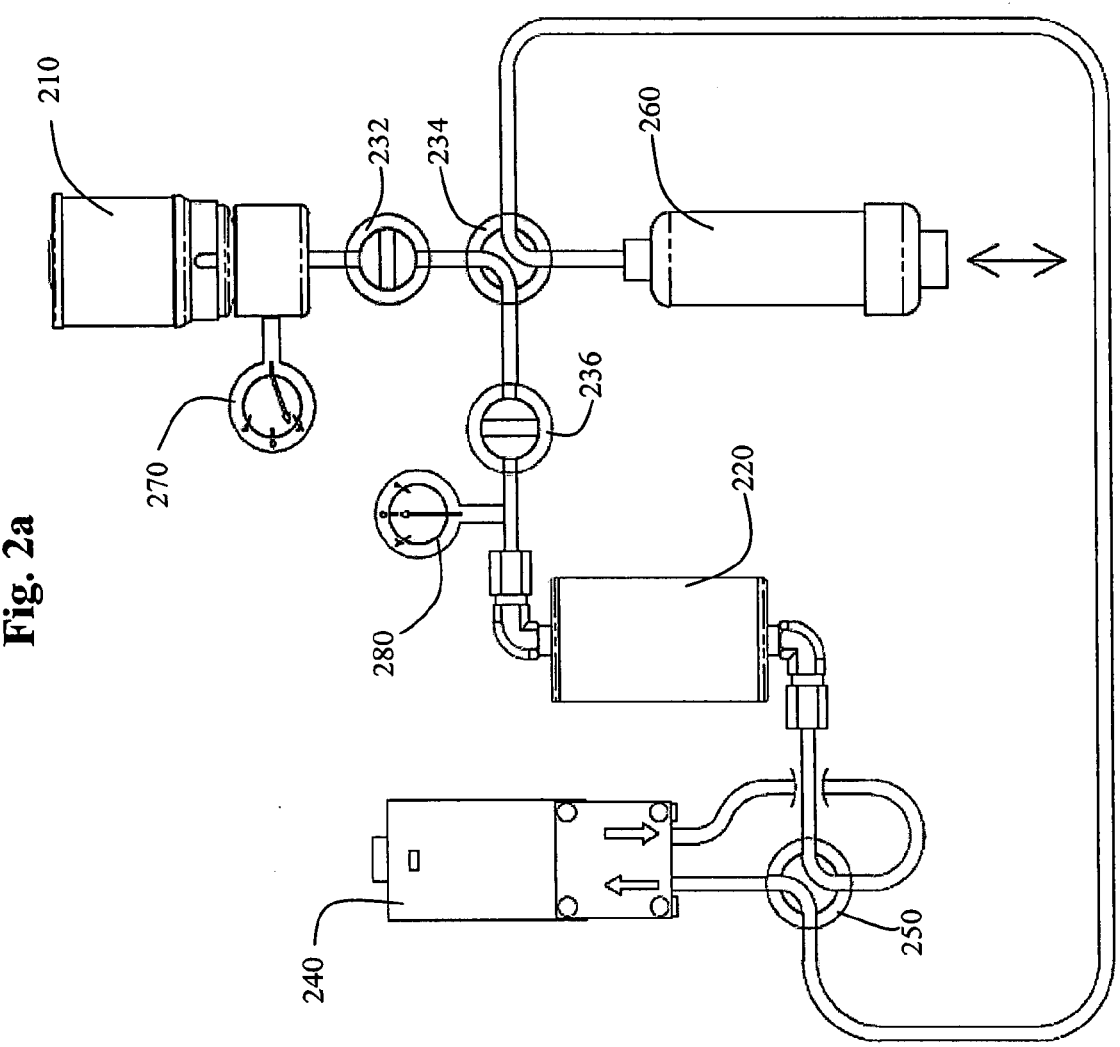

FIG. 2a schematically shows an exemplary two—pass single stage embodiment at an initial state. At initial state, oxygen-ozone cell 210 is held under vacuum. For example, the pressure of oxygen-ozone cell 210 may be between about negative 6-18 psig, for instance, in one preferred embodiment, the pressure within oxygen-ozone cell 210 may be about −12 psig. The content, if any, of oxygen-ozone cell 210 may be primarily of atmospheric/ambient air or residual oxygen following at least one purge cycle. Two-way valve 236 (as well as two-way valve 232) can be closed so as not to permit communication between cell 110 and zeolite chamber 120. At initial state, zeolite chamber 220 may be at about atmospheric pressure and pump 240 is off.

Figure 2B:
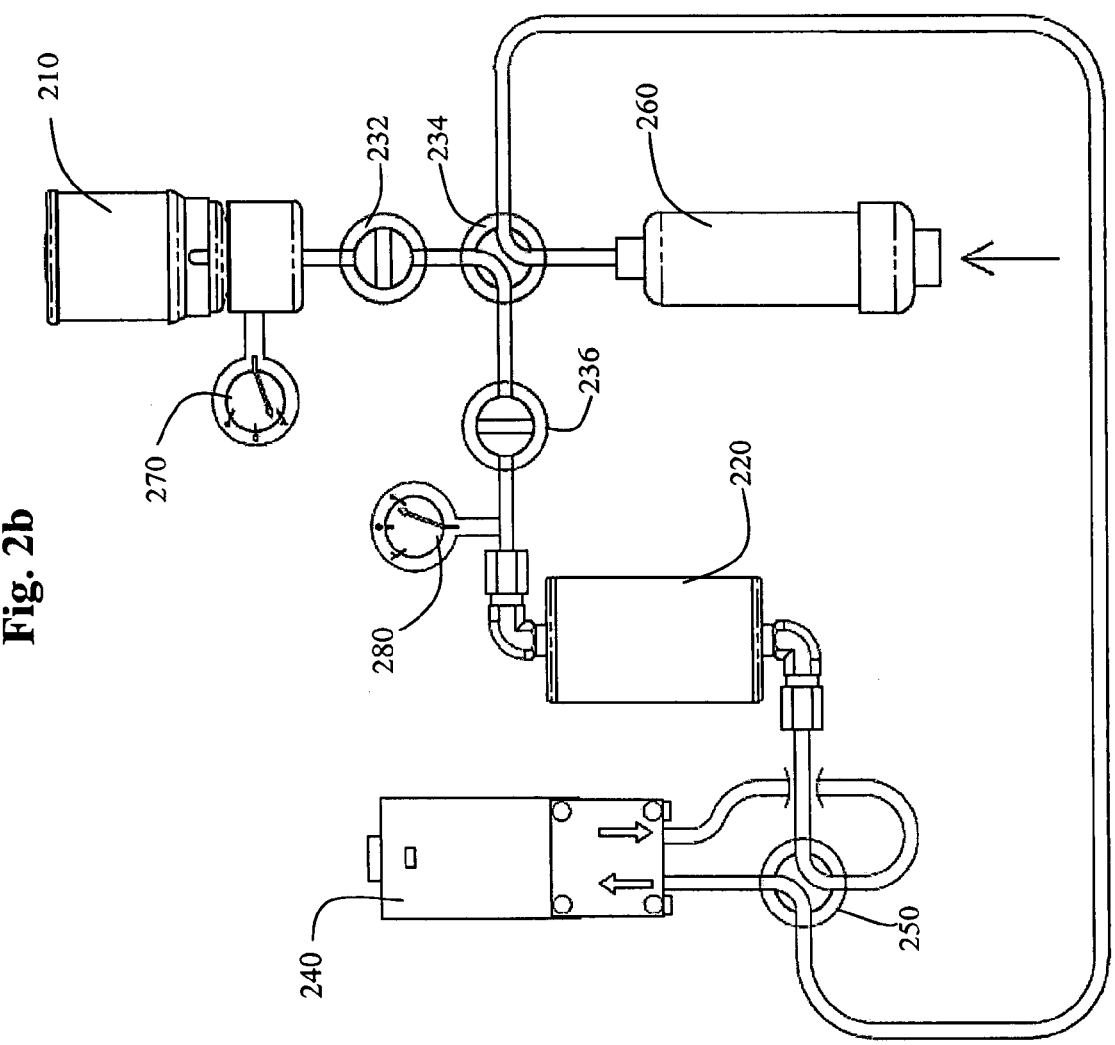

FIG. 2b depicts how an exemplary embodiment can concentrate (generate substantially more pure) oxygen by pressurizing zeolite chamber 220. Pump 240 is on and may pull air through desiccant chamber 260 and push air into zeolite chamber 220, thus, pressuring chamber 220. Zeolite chamber 220 has at least one zeolite acting as a molecular sieve for adsorbing (selectively sorting) at least a substantial amount of nitrogen while not adsorbing at least a substantial portion of oxygen, thus, concentrating the oxygen (and may also concentrate other components such as argon) within zeolite chamber 220. As a result of pressurizing zeolite chamber 220 with substantially concentrated oxygen, the pressure in chamber 220 can be between about 11-33 psig, for example, in one preferred embodiment, the pressure may be about 22 psig.

Figure 2C:
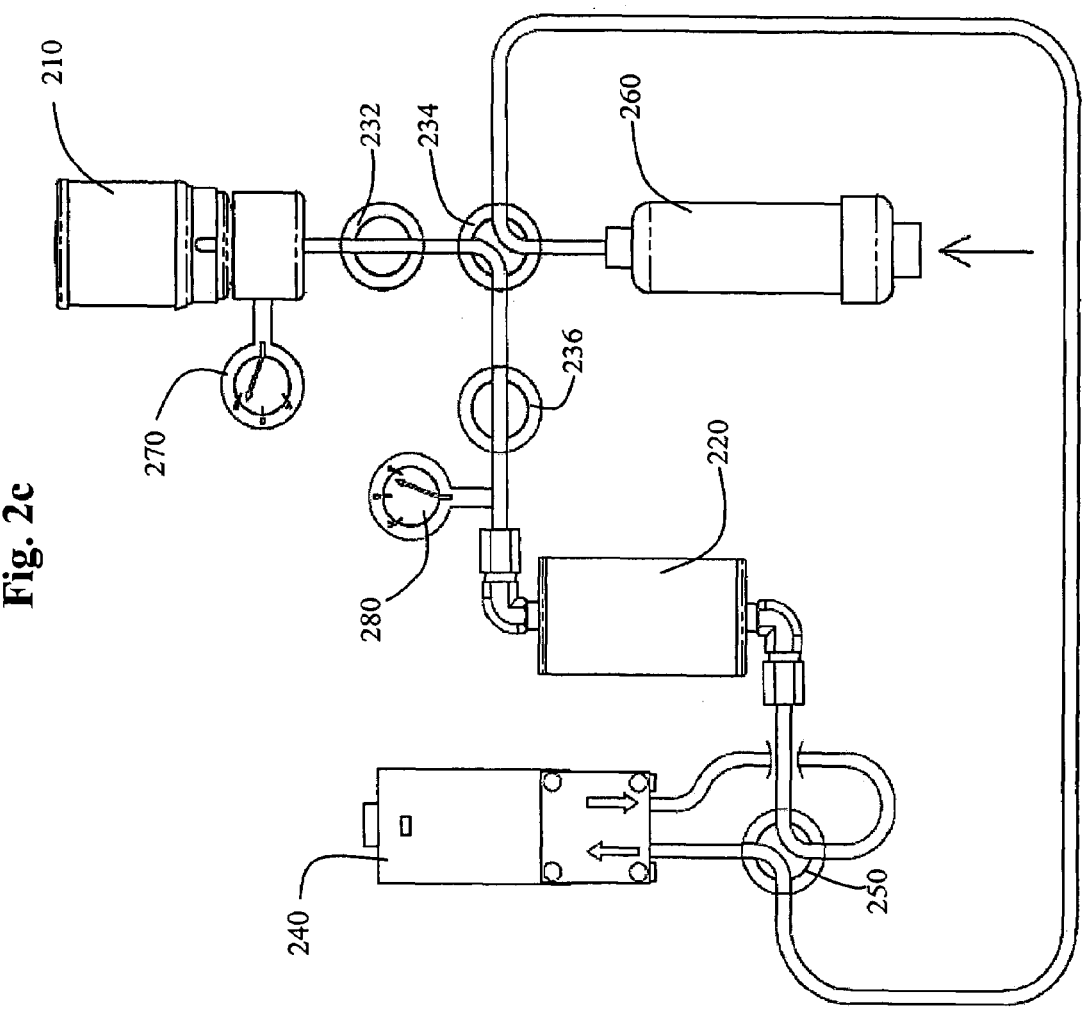

FIG. 2c schematically depicts how oxygen-ozone cell 210 is filled in an exemplary embodiment. Two-way valves 232 and 236 can be opened and four-way valve 234 maintains its orientation so as to permit communication between cell 210 and zeolite chamber 220 where pump 240 may continue to pressurize zeolite chamber 220 maintaining concentrated oxygen in both cell 210 and zeolite chamber 220. As a result of this configuration, both zeolite chamber 220 and cell 210 may have concentrated oxygen that can be held at a pressure of between about 11-33 psig in each respective chamber, for example, in one preferred embodiment, the pressure may be maintained at about 22 psig in each chamber.

FIG. 2d shows an exemplary nitrogen purging (flushing) step for an exemplary embodiment. Two-way valves 232 and 236 can be closed so as to not permit communication between oxygen-ozone cell 210 and zeolite chamber 220, thus, the embodiment may be said to sequester oxygen under pressure (of about 11-33 psig, preferably, about 22 psig) in cell 210. Pump 240 can be ran in the opposite direction, as schematically depicted by the orientation of four-way valve 250, so as to pull, among other contents, nitrogen from zeolite chamber 220 (as well as from the apparatus and system as a whole) and pump nitrogen out, for instance, through desiccant chamber 260 into the surrounding environment as well as through any other exhaust mechanisms known to one having ordinary skill in the art.

Figure 2E:
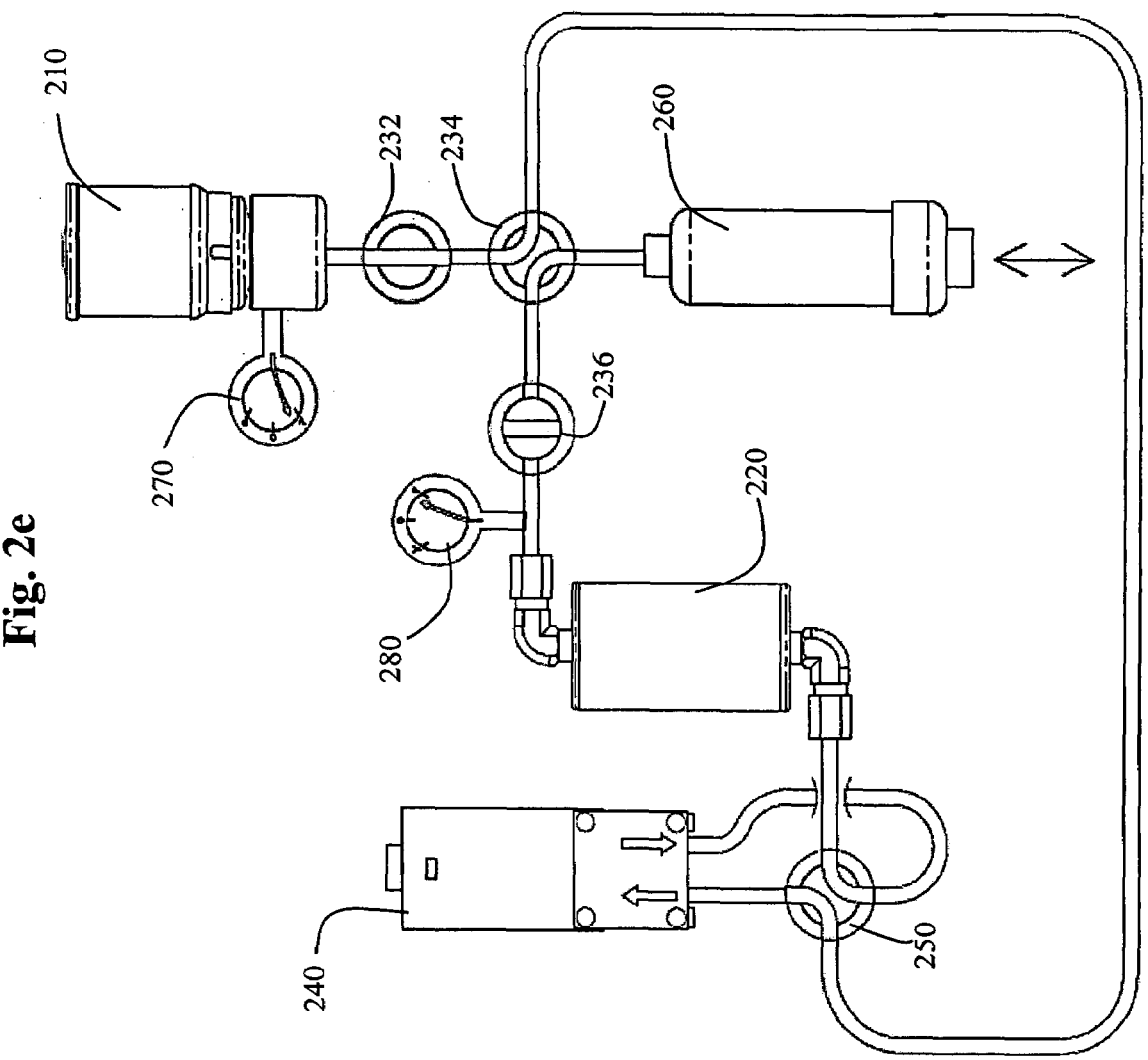

FIG. 2e schematically shows a step for recycling concentrated oxygen found within oxygen-ozone cell 210. Pump 240 may be returned to running in the first direction as depicted by the orientation of four-way valve 250. The system as a whole may be closed where oxygen-ozone cell 210 can be configured to be in direct fluid communication with pump 240 via, for example, by opening two-way valve 232 and configured four-way valve 234 to communicate with pump 240 to the exclusion of desiccant chamber 260. As a result, concentrated oxygen may be pulled from oxygen-ozone cell 210 and ran through pump 240 and pumped into zeolite chamber 220. Thus, zeolite chamber 220 may be pressurized with the concentrated oxygen from oxygen-ozone cell and oxygen-ozone cell 210 can be under vacuum conditions of, for example, about negative 4-12 psig, preferably, about −8 psig. The oxygen in zeolite chamber 220 can be further concentrated because of the adsorption of remaining nitrogen due to the at least one zeolite of zeolite chamber 220. The further concentrated oxygen may be held under a pressure of about 7-23 psig, preferably, 15 psig.

Figure 2F:
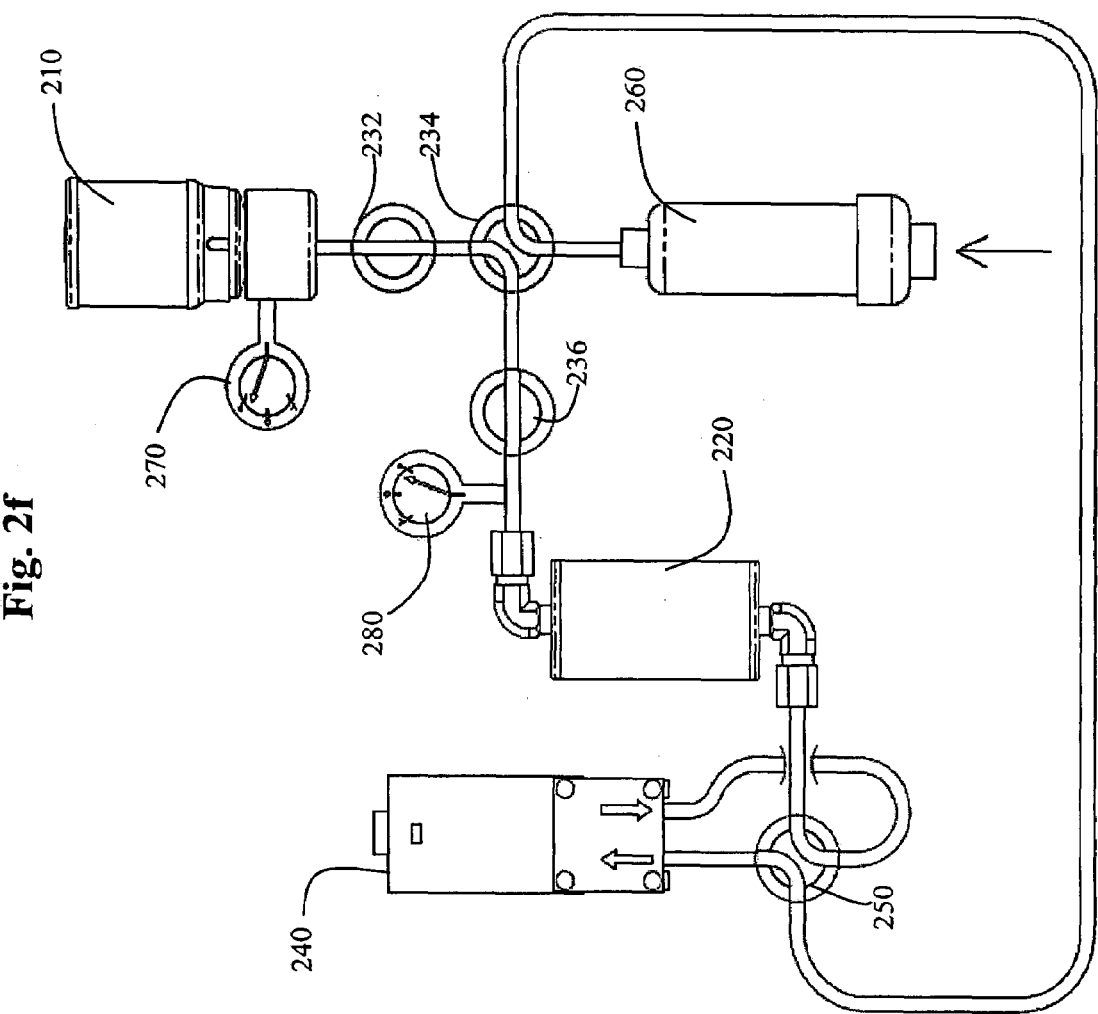

FIG. 2f depicts a configuration and step for refilling oxygen-ozone cell 210 in an embodiment of the present invention. For example, two-way valve 232, four-way valve 234 and two-way valve 236 can be configured so as to permit communication between cell 210 and zeolite chamber 220. Moreover, the system is restored to an open arrangement where pump 240 pulls atmospheric/ambient air through desiccant chamber 260, which may be the result of configuring four-way valve 234 for such a purpose. Allowing additional air into the embodiment can act to counter-balance the volume of nitrogen and oxygen purged and, thus, it may restore gas volume of this configuration/step to about the same overall volume as it would have in the configuration/step of FIG. 2c. As a result of this configuration/step, a substantial amount of the further concentrated oxygen from zeolite chamber 220 may be forced into oxygen-ozone cell 210. Both zeolite chamber 220 and cell 210 may have concentrated oxygen that can be held at a pressure of between about 11-33 psig in each respective chamber, preferably, the pressure may be maintained at about 22 psig in each chamber.

Figure 2G:
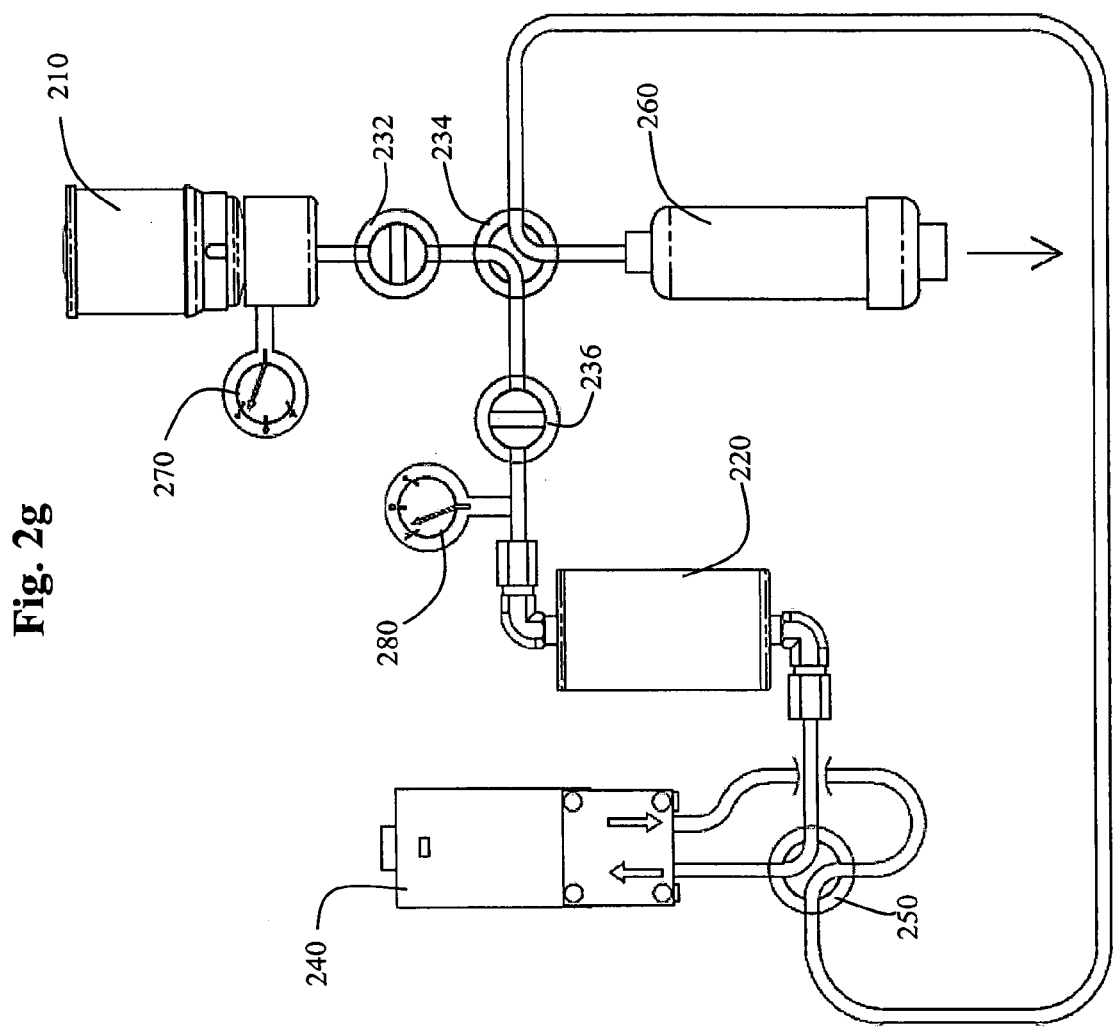

FIG. 2g schematically shows a second nitrogen purging step directed to zeolite chamber 220, which is substantially similarly to that shown in FIG. 2d. Fluid communication between zeolite chamber 220 and oxygen-ozone cell 210 is impeded, for instance, by closing two-way valve 232. Two-way valve 236 may also be closed. Thus, the embodiment may be said to sequester oxygen under pressure (of about 11-33 psig, preferably, about 22 psig) in cell 210. Pump 240 can be ran in the opposite direction, as schematically depicted by the orientation of four-way valve 250, so as to pull, among other contents, nitrogen from zeolite chamber 220 and pump nitrogen out, for instance, through desiccant chamber 260 into the surrounding environment as well as through any other exhaust mechanisms known to one having ordinary skill in the art. Oxygen-ozone cell 210 may be removed and the oxygen therein may be of substantial purity as to be available for ozone conversion as needed, for example, for therapeutic purposes. If another oxygen-ozone cell without concentrated oxygen replaces cell 210 after removal and pump 240 is turned off, the embodiment may be returned to initial state as shown in FIG. 2a.

Referring generally to FIGS. 3a-f, an exemplary one-pass dual stage embodiment for filling an oxygen-ozone cell with substantially concentrated oxygen is shown. The exemplary embodiment can include oxygen-ozone cell (cell chamber) 310 in valvably-controlled fluid communication with zeolite chamber 322 via, for example, two-way valve 330. Pump 340 may be in valvably-controlled fluid communication with desiccant chamber 160 via, for example, four-way valve 350. Pump 340 also can be in valvably-controlled fluid communication directly with zeolite chamber 324 as well as in valvably-controlled fluid communication both directly and indirectly (i.e. through zeolite chamber 324) with zeolite chamber 322 via, for example, the use of three-way valves 352 and 354. Zeolite chambers 322 and 324 are in valvably-controlled fluid communication via, for example, three-way valve 354. Optionally, pressure gages such as gages 370, 382 and 384 may be included with exemplary embodiments for measuring and/or controlling the pressure within cell 310, zeolite chambers 322 and 324, respectively.

Figure 3A:
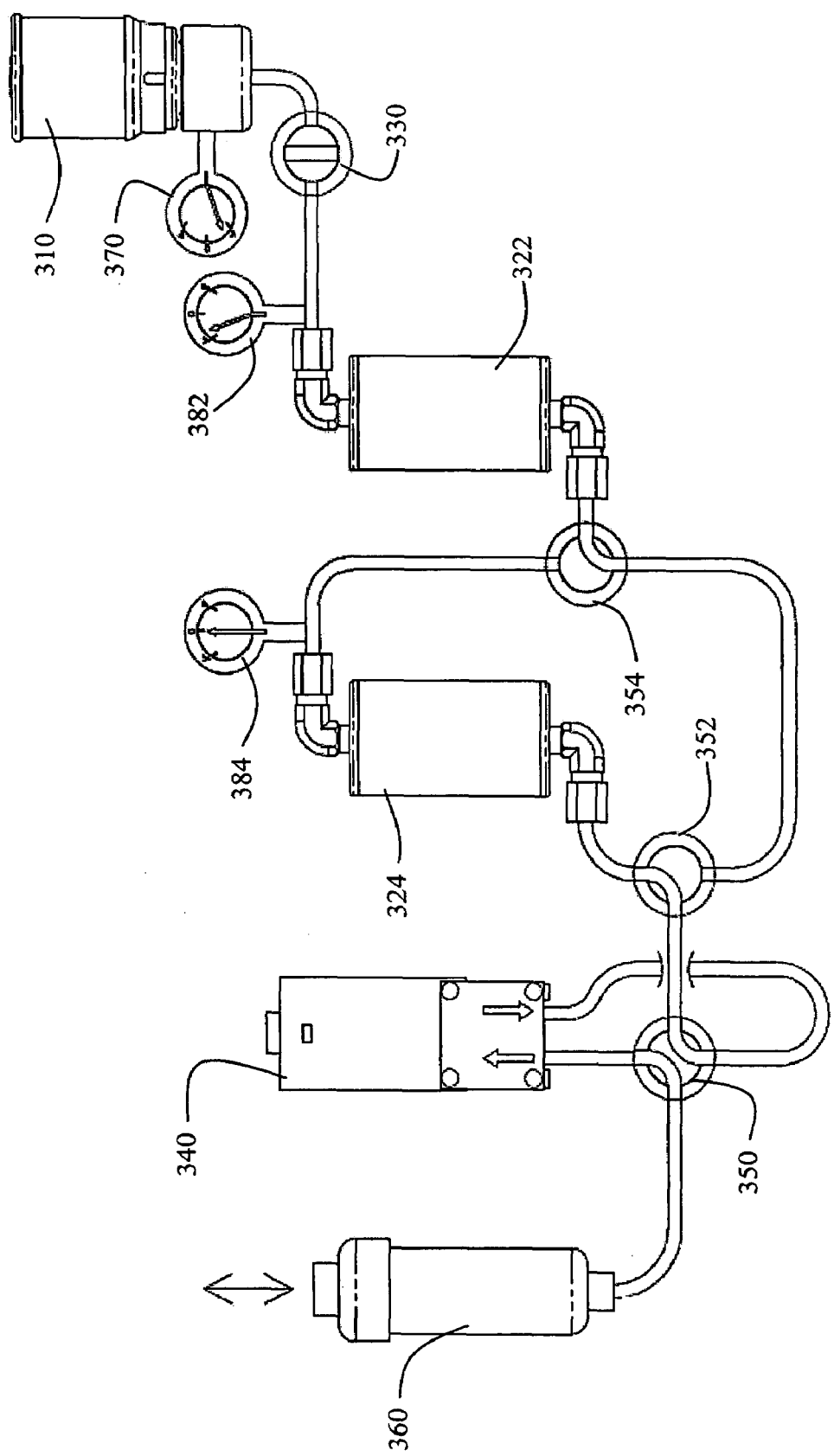
FIGS. 3*a-f* are exemplary schematics showing a one-pass dual stage embodiment.

FIG. 3a schematically shows an exemplary one-pass dual stage embodiment at an initial state. At initial state, oxygen-ozone cell 310 may be held under vacuum as represented in the schematic by the dial on pressure gage 370. For example, the pressure of oxygen-ozone cell 310 may be between about negative 6-18 psig, for instance, in one preferred embodiment, the pressure within oxygen-ozone cell 310 may be about −12 psig. Oxygen-ozone cell 310 may be provided for use already under vacuum. The content, if any, of oxygen-ozone cell 310 may be primarily of atmospheric air or residual oxygen following at least one purge cycle when used within at least one embodiment. Also, second zeolite chamber 322 may contain air under vacuum conditions where the pressure may be between negative 4-12 psig, preferably, about −8 psig. At initial state, first zeolite chamber 324 may be at about atmospheric pressure and pump 340 is off.

Figure 3B:
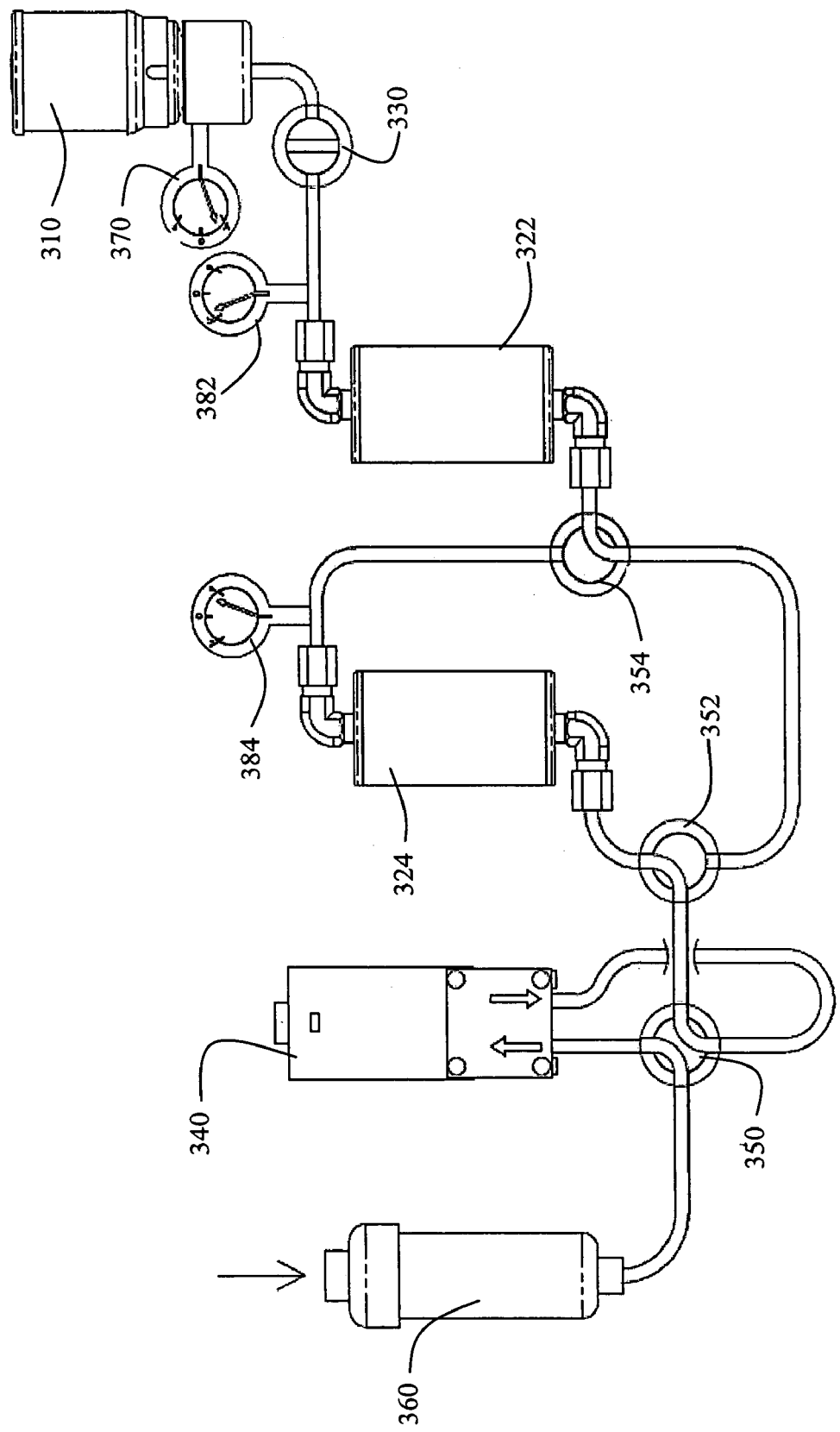

FIG. 3b schematically shows an exemplary embodiment where oxygen is concentrated/generated from air. Pump 340 is turned on and may pull air through desiccant chamber 360 and pump air into zeolite chamber 324 causing the chamber to be pressurized. Zeolite chamber 324 has at least one zeolite material acting as a molecular sieve for adsorbing (selectively sorting) at least a substantial amount of nitrogen within zeolite chamber 324. As a result of pressurizing zeolite chamber 324 with substantially concentrated oxygen, the pressure in the chamber can be between about 11-33 psig, for example, in one preferred embodiment, the pressure may be about 22 psig.

Figure 3C:
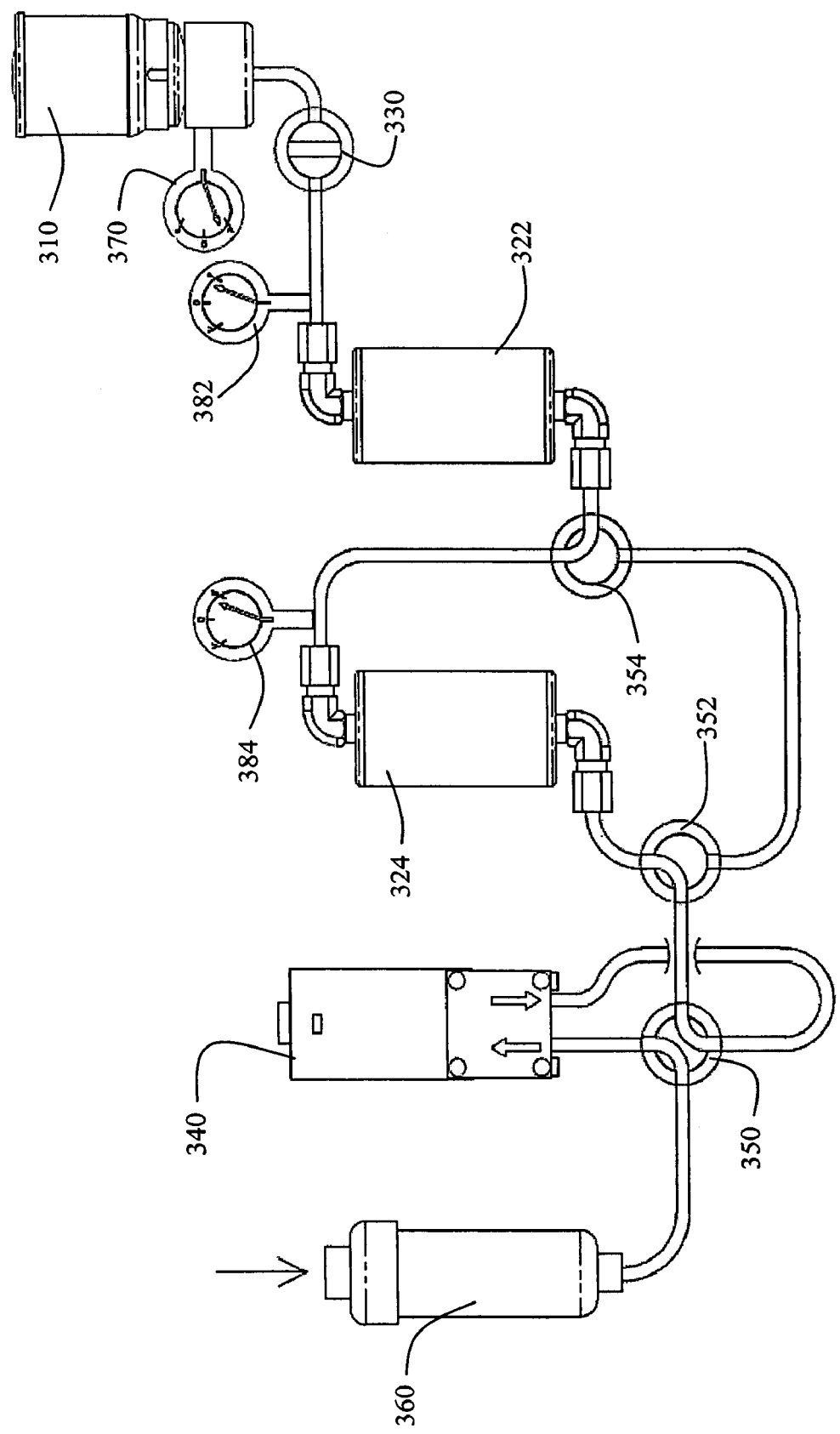

FIG. 3c schematically shows an exemplary embodiment where substantially concentrated oxygen is further concentrated/generated through pressurizing second zeolite chamber 322 as well as continuing to hold first zeolite chamber 324 under pressure. Zeolite chamber 324 and zeolite chamber 322 are configured to be in fluid communication with each other, for example, by oriented three-way valve 354 to accomplish such a purpose. As a result of this configuration, a substantial amount of concentrated oxygen from first zeolite chamber 324 may be forced into second zeolite chamber 324. Both zeolite chamber 322 and 324 may have concentrated oxygen that can be held at a pressure of between about 11-33 psig in each respective chamber, preferably, the pressure may be maintained at about 22 psig in each chamber.

Figure 3D:
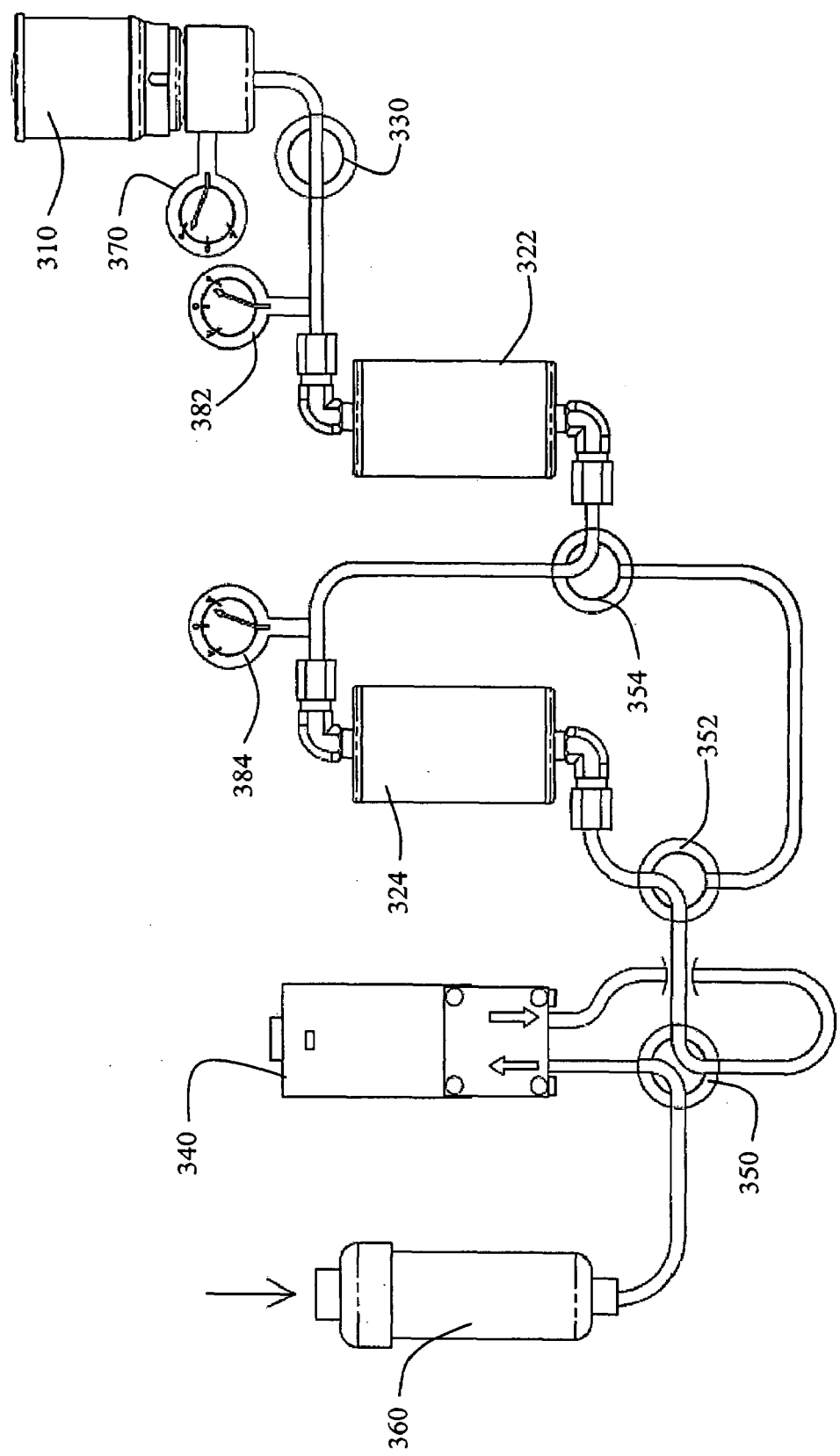

FIG. 3d shows how oxygen-ozone cell 310 is filled in an exemplary embodiment. Fluid communication can be permitted between zeolite chamber 322 and oxygen-ozone cell 310 by, for example, opening two-way valve 330. As a result of this configuration, a substantial amount of concentrated oxygen from second zeolite chamber 322 may be forced into oxygen-ozone cell 310. Both zeolite chamber 322 and 324 as well as cell 310 may have concentrated oxygen that can be held at a pressure of between about 11-33 psig in each respective chamber, preferably, the pressure may be maintained at about 22 psig in each chamber.

Figure 3E:
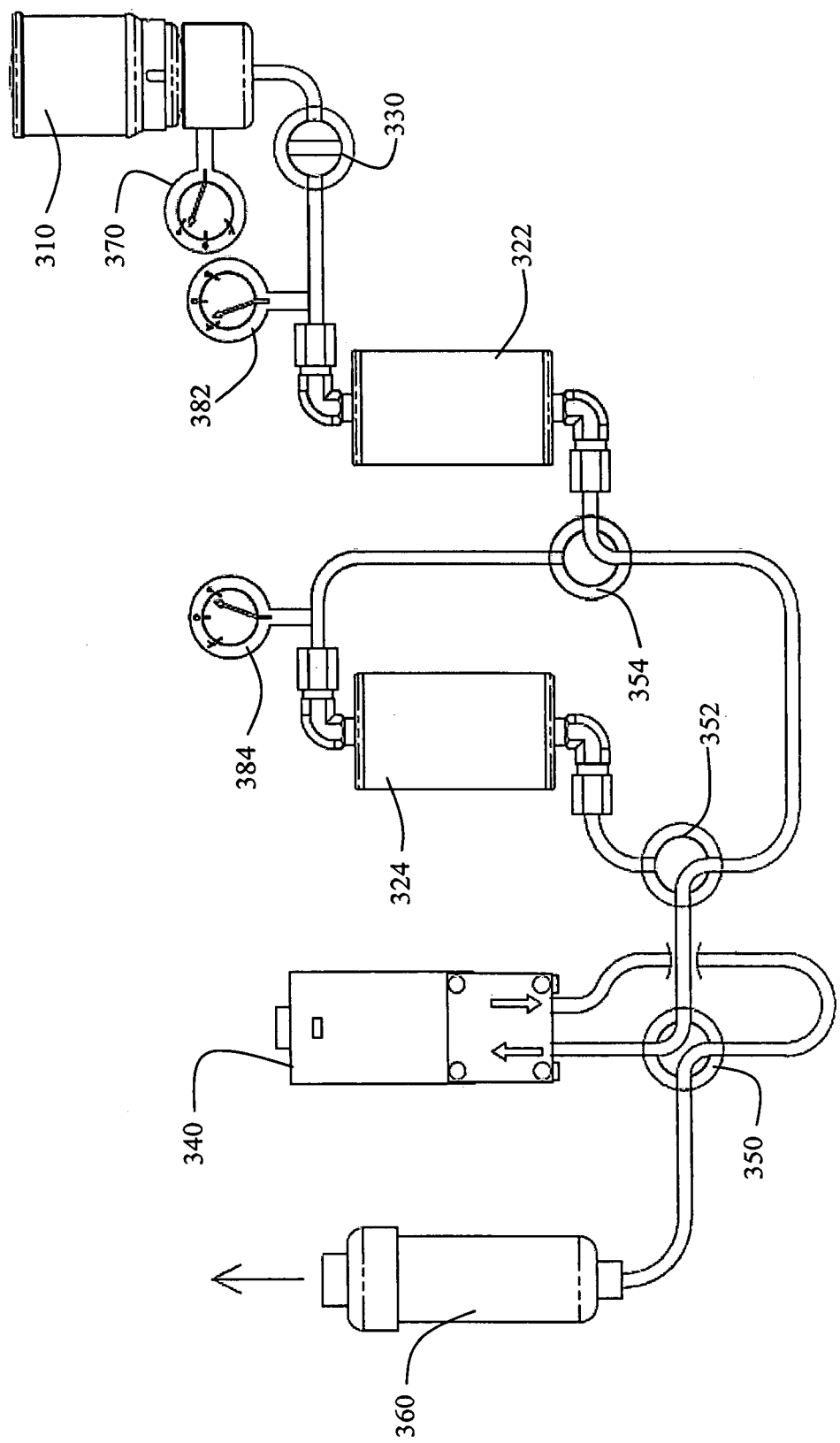

FIG. 3e schematically depicts a nitrogen (flushing) purging step directed to second zeolite chamber 322. Fluid communication between zeolite chamber 322 and oxygen-ozone cell 310 is impeded, for instance, by closing two-way valve 330, thus, the embodiment may be said to sequester oxygen under pressure (of about 11-33 psig, preferably, about 22 psig) in cell 310. Also, second zeolite chamber 322 may be put into direct communication with pump 340 (and communication with first zeolite chamber 324 may not be permitted), for instance, by orienting three-way valves 352 and 354 to accomplish such a purpose. Also, the configurations of three-way valves 352 and 354 can function to sequester zeolite chamber 324. Pump 340 can be ran in the opposite direction, as schematically depicted by the orientation of four-way valve 350, so as to pull, among other contents, nitrogen from zeolite chamber 322 and pump nitrogen out, for instance, through desiccant chamber 360 into the surrounding environment as well as through any other exhaust mechanisms known to one having ordinary skill in the art. During this step, zeolite chamber 322 may have, if any contents, a mix of both oxygen and nitrogen (e.g., that may be similar to the composition of air) under vacuum conditions, for example, with a pressure of about negative 4-12 psig, preferably, about −8 psig.

Figure 3F:
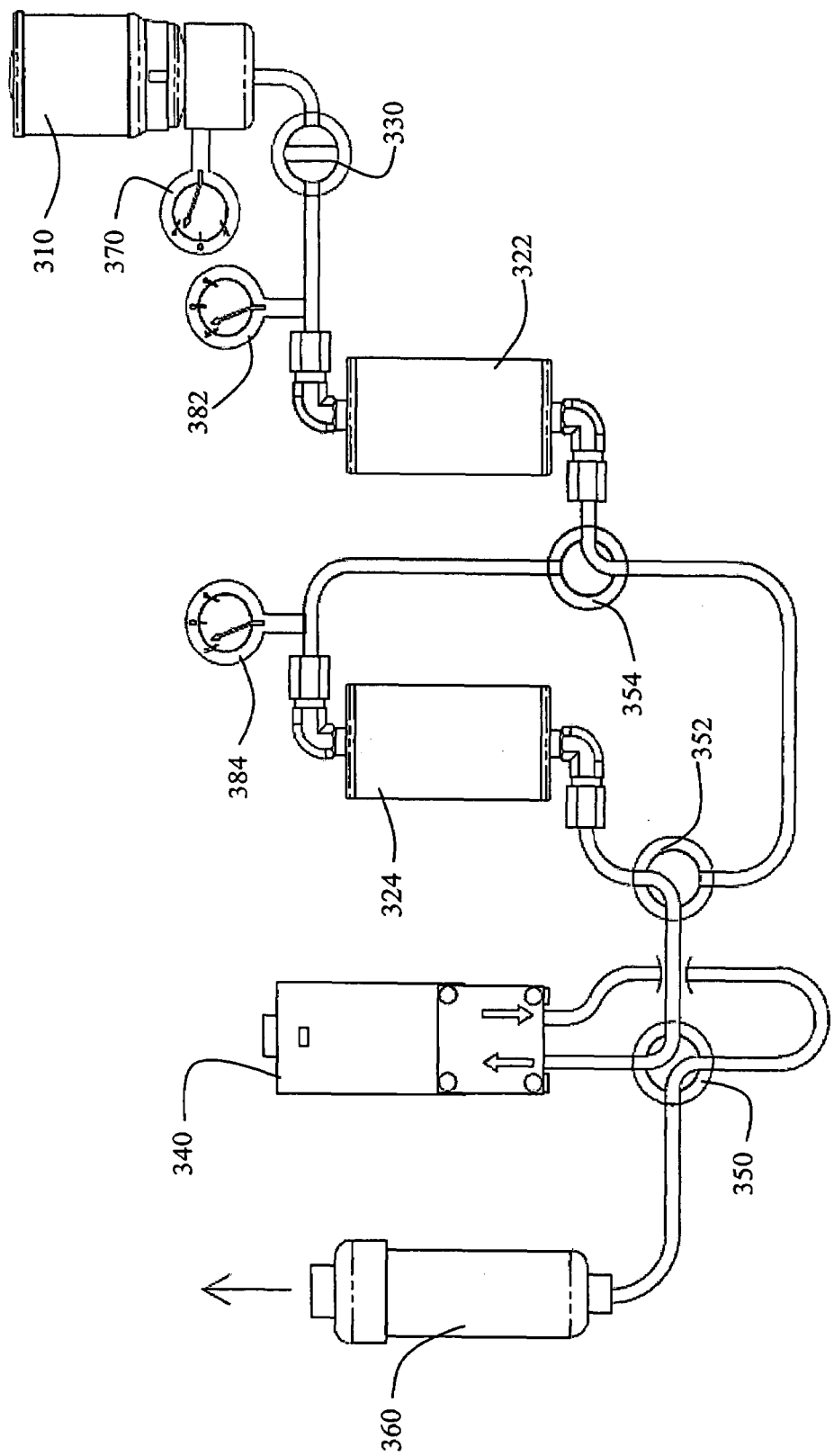

FIG. 3f shows a nitrogen purging step directed to first zeolite chamber 324. This may be accomplished by establishing fluid communication directly between pump 340 and the previously sequestered first zeolite chamber 324 to the exclusion of communication between pump 340 and second zeolite chamber 322 via, for instance, configuring three-way valves 352 and 354 for such a purpose. Thus, Pump 340 can pull, among other contents, nitrogen from zeolite chamber 322 and pump nitrogen out, for instance, through desiccant chamber 360 into the surrounding environment as well as through any other exhaust mechanisms known to one having ordinary skill in the art. Second zeolite chamber 322 may then contain, if any content, nitrogen and oxygen (e.g. similar to the composition of air) under vacuum conditions where the pressure may be between negative 4-12 psig, preferably, about −8 psig. First zeolite chamber 324 may be about atmospheric pressure. Oxygen-ozone cell 310 may be removed and the oxygen therein may be of substantial purity as to be available for ozone conversion as needed, for example, for therapeutic purposes. If another oxygen-ozone cell without concentrated oxygen replaces cell 310 after removal and pump 340 is turned off, the embodiment may be returned to initial state as shown in FIG. 3a. Oxygen-ozone cell 310 may be removed and the oxygen therein may be of substantial purity as to be available for ozone conversion as needed, for example, for therapeutic purposes. If another oxygen-ozone cell without concentrated oxygen replaces cell 310 after removal and pump 340 is turned off, the embodiment may be returned to initial state as shown in FIG. 3a.

Referring generally to FIGS. 4a-i, an exemplary two-pass dual stage embodiment for filling an oxygen-ozone cell with substantially concentrated oxygen is shown. The exemplary embodiment can include oxygen-ozone cell (cell chamber) 410 in valvably-controlled fluid communication with zeolite chamber 422 via, for example, two-way valve 432, four-way valve 434 and two-way valve 436. Also, oxygen-ozone cell 410 may be in valvably-controlled fluid communication directly (i.e. not through intercommunication with zeolite chambers 422 and 424) with pump 440 via, for example, two-way valve 432, four-way valve 434 and four-way valve 450. Pump 440 may be in valvably-controlled fluid communication with desiccant chamber 460 via, for example, four-way valve 450 and four-way valve 434. Pump 440 also can be in valvably-controlled fluid communication directly with zeolite chamber 424 as well as in valvably-controlled fluid communication both directly and indirectly (i.e. through zeolite chamber 424) with zeolite chamber 422 via, for example, the use of three-way valves 452 and 454. While zeolite chambers 422 and 424 are in valvably-controlled fluid communication via, for example, three-way valve 454. Optionally, pressure gages such as gages 470, 482 and 484 may be included with exemplary embodiments for measuring and/or controlling the pressure within cell 410, zeolite chambers 422 and 424, respectively.

Figure 4A:
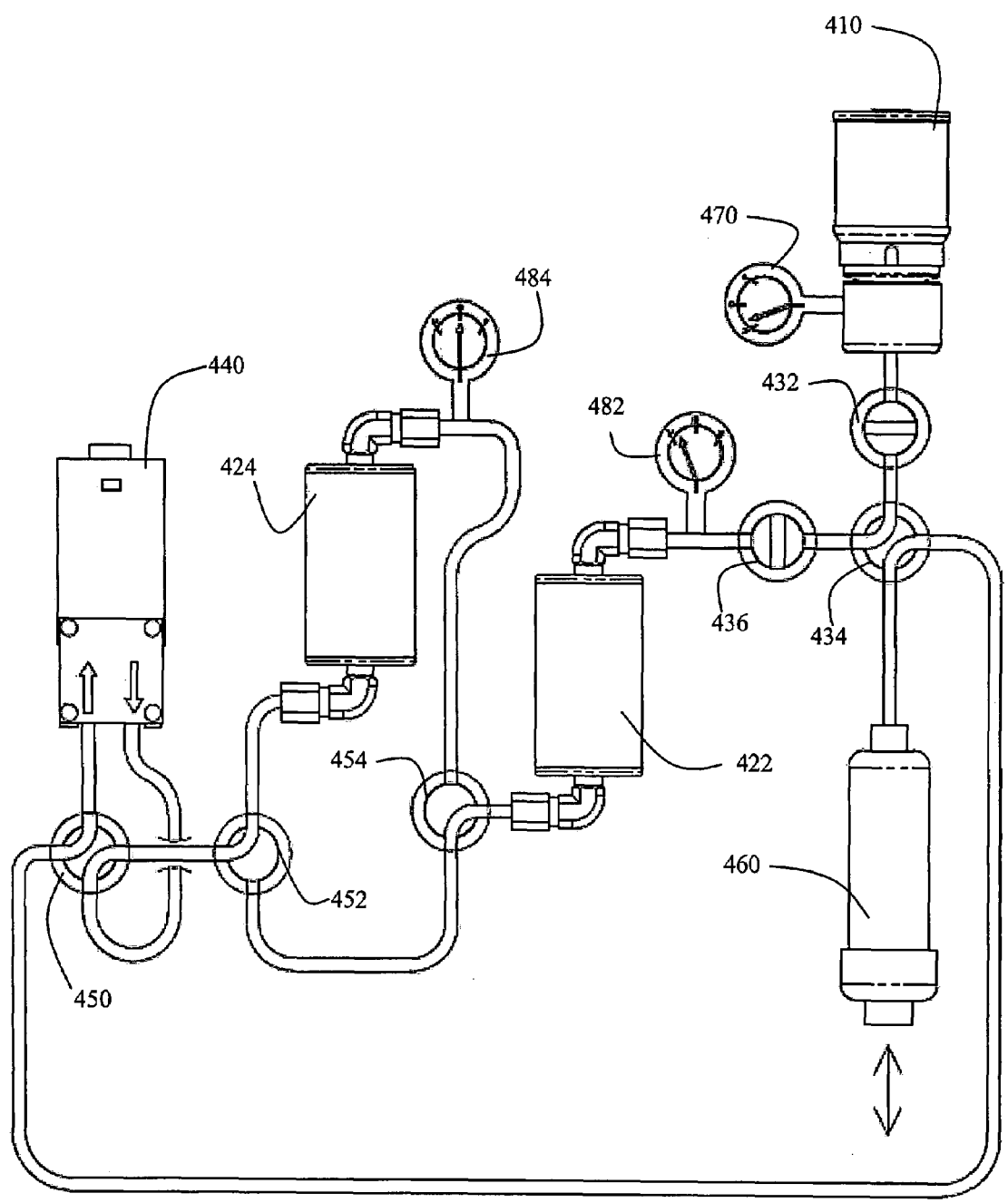
FIGS. 4*a-i* are exemplary schematics showing a two-pass dual stage embodiment.

FIG. 4a schematically shows an exemplary two-pass dual stage embodiment at an initial state. At initial state, oxygen-ozone cell 410 may be held under vacuum as represented in the schematic by the dial on pressure gage 470. For example, the pressure of oxygen-ozone cell 410 may be between about negative 6-18 psig, for instance, in one preferred embodiment, the pressure within oxygen-ozone cell 410 may be about −12 psig. Oxygen-ozone cell 410 may be provided for use already under vacuum. The content, if any, of oxygen-ozone cell 410 may be primarily of atmospheric air or residual oxygen following at least one purge cycle when used within at least one embodiment. Similarly, second zeolite chamber 422 may contain air under vacuum conditions where the pressure may be between negative 4-12 psig, preferably, about −8 psig. At initial state, first zeolite chamber 424 may be at about atmospheric pressure and pump 440 is off.

Figure 4B:
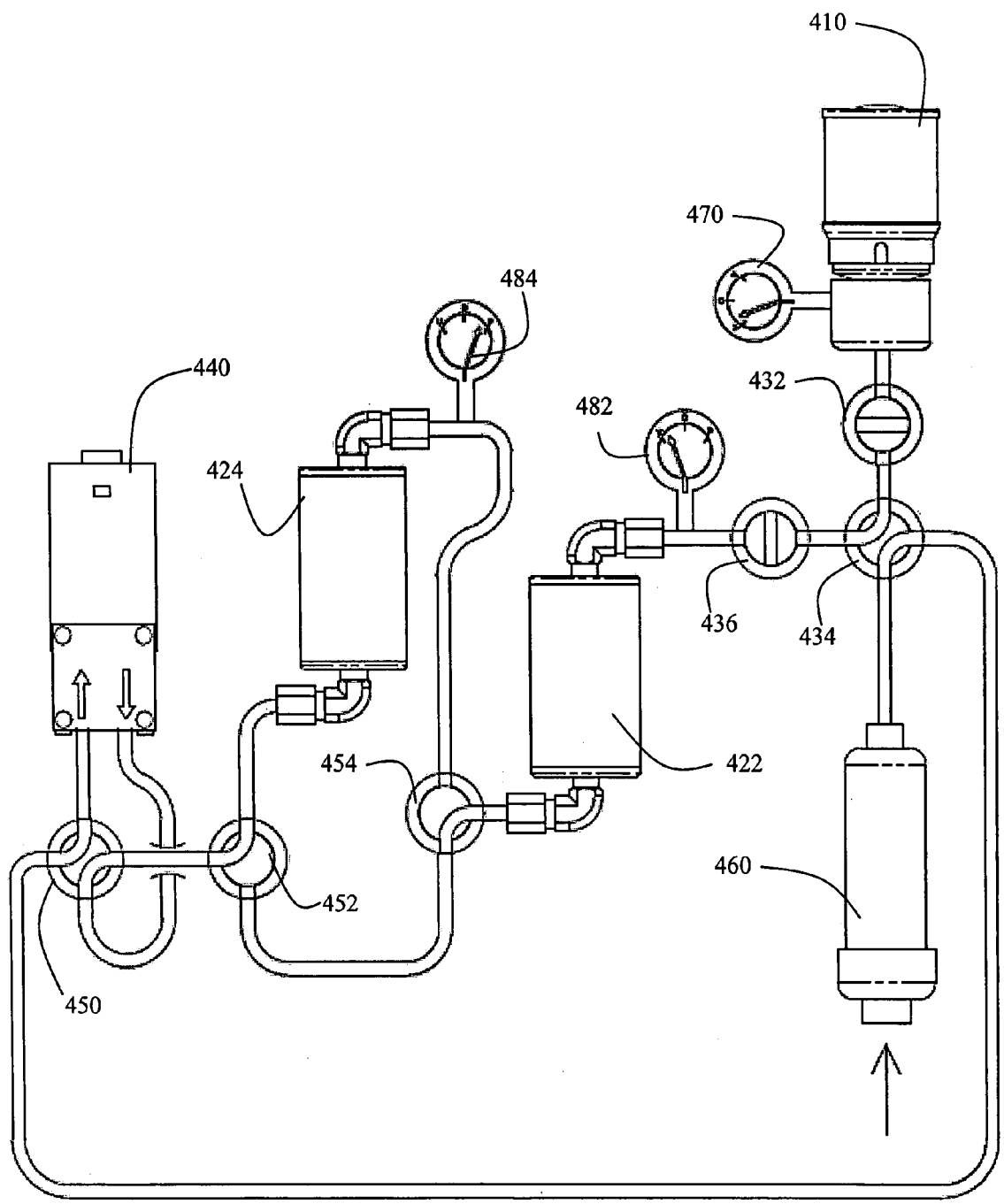

FIG. 4b schematically shows an exemplary embodiment where oxygen is concentrated/generated from air and where zeolite chamber 424 can be pressurized. Pump 440 is turned on and may pull air through desiccant chamber 460 and pump air into zeolite chamber 424 causing the chamber to be pressurized. Zeolite chamber 424 has at least one zeolite acting as a molecular sieve for adsorbing (selectively sorting) at least a substantial amount of nitrogen within zeolite chamber 424. As a result of pressurizing zeolite chamber 424 with substantially concentrated oxygen, the pressure in the chamber can be between about 11-33 psig, for example, in one preferred embodiment, the pressure may be about 22 psig.

Figure 4C:
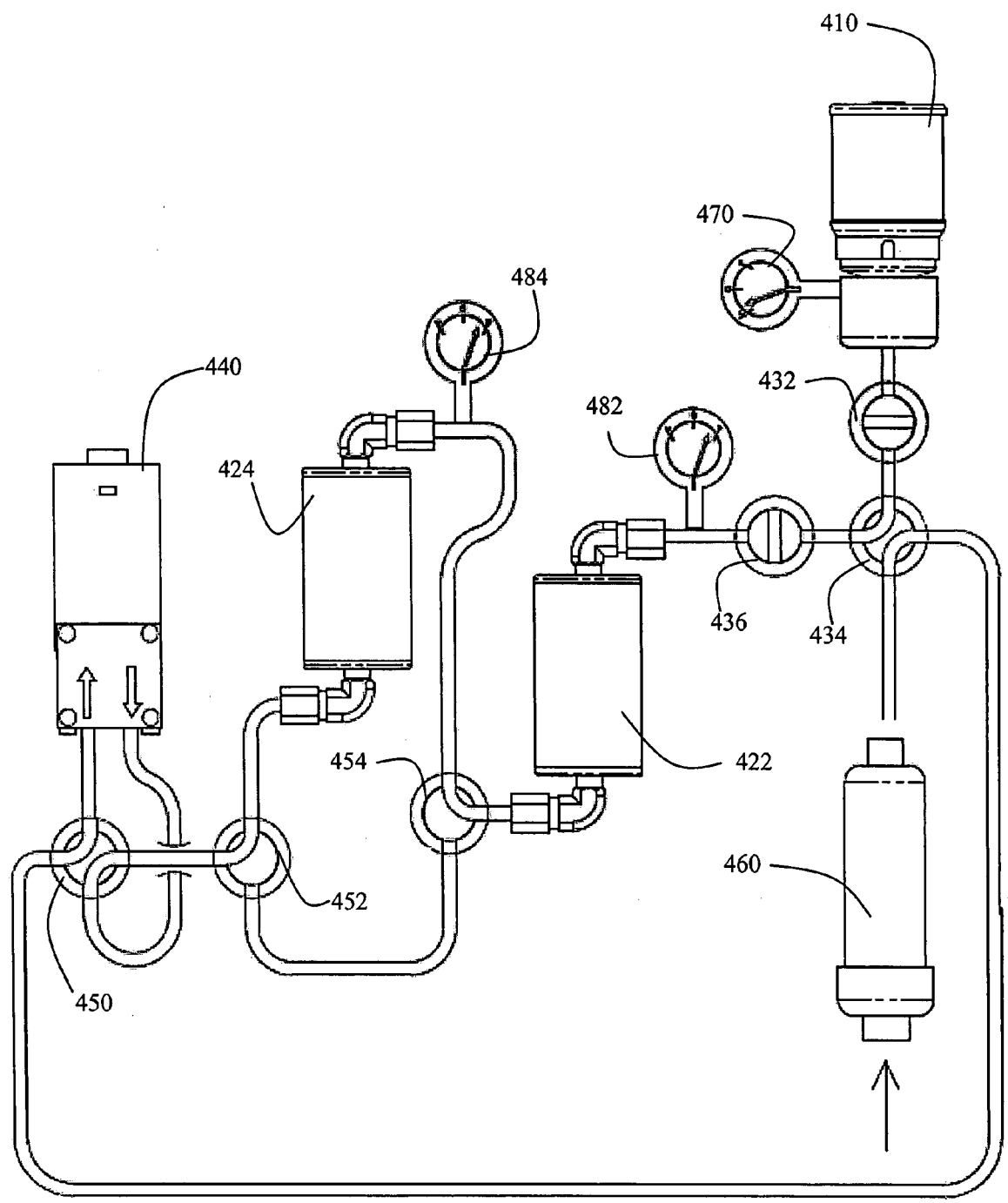

FIG. 4c schematically shows an exemplary embodiment where substantially concentrated oxygen is further concentrated/generated through pressurizing second zeolite chamber 422 as well as continuing to hold first zeolite chamber 424 under pressure. Zeolite chamber 424 and zeolite chamber 422 are configured to be in fluid communication with each other, for example, by oriented three-way valve 454 to accomplish such a purpose. As a result of this configuration, a substantial amount of concentrated oxygen from first zeolite chamber 424 may be forced into second zeolite chamber 424. Both zeolite chamber 422 and 424 may have concentrated oxygen that can be held at a pressure of between about 11-33 psig in each respective chamber, preferably, the pressure may be maintained at about 22 psig in each chamber.

Figure 4D:
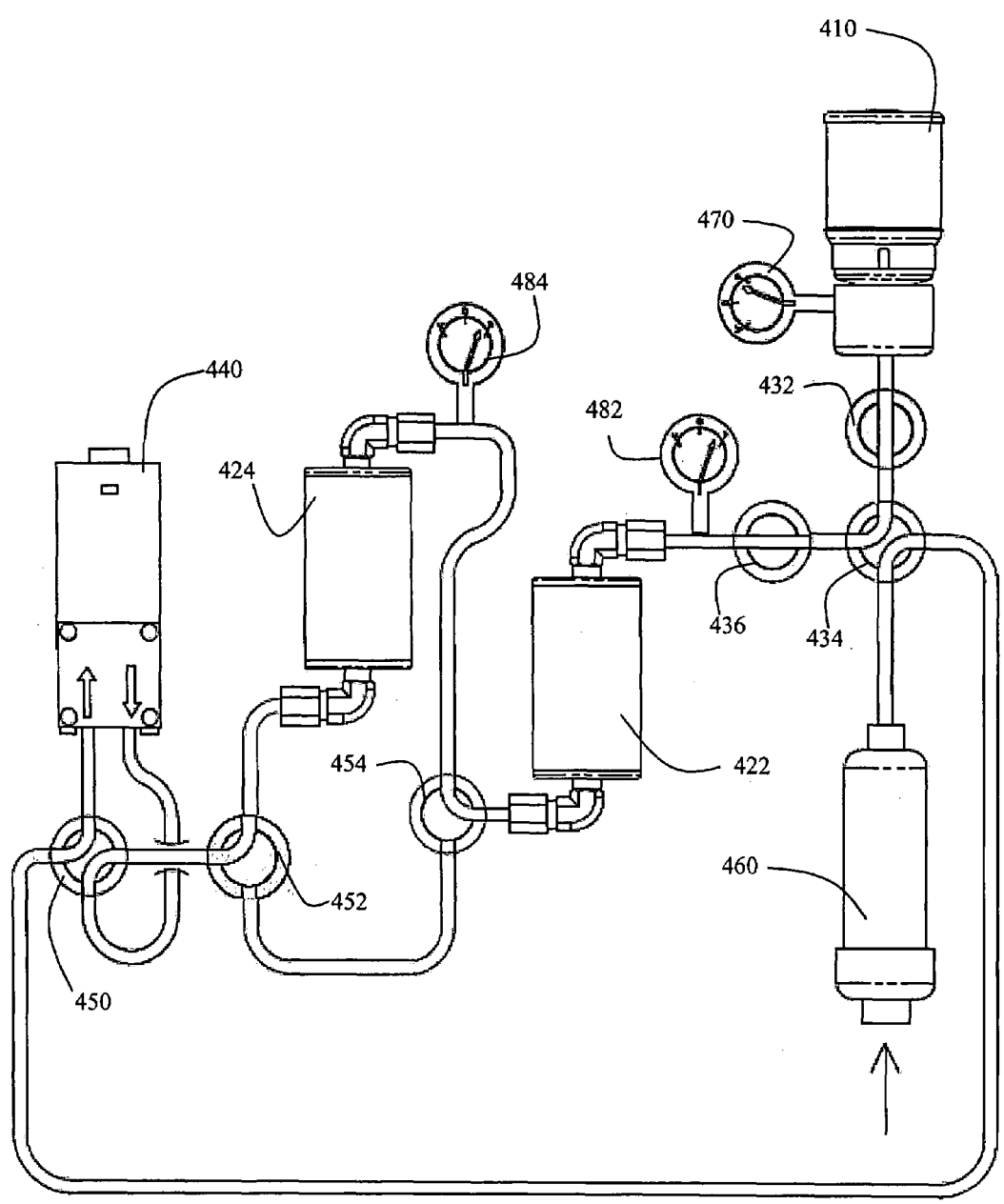

FIG. 4d shows how oxygen-ozone cell 410 is filled in an exemplary embodiment. For example, two-way valve 432, four-way valve 434 and two-way valve 436 can be configured so as to permit communication between cell 410 and zeolite chamber 422. As a result of this configuration, a substantial amount of concentrated oxygen from second zeolite chamber 422 may be forced into oxygen-ozone cell 410. Both zeolite chamber 422 and 424 as well as cell 410 may have concentrated oxygen that can be held at a pressure of between about 11-33 psig in each respective chamber, preferably, the pressure may be maintained at about 22 psig in each chamber.

Figure 4E:
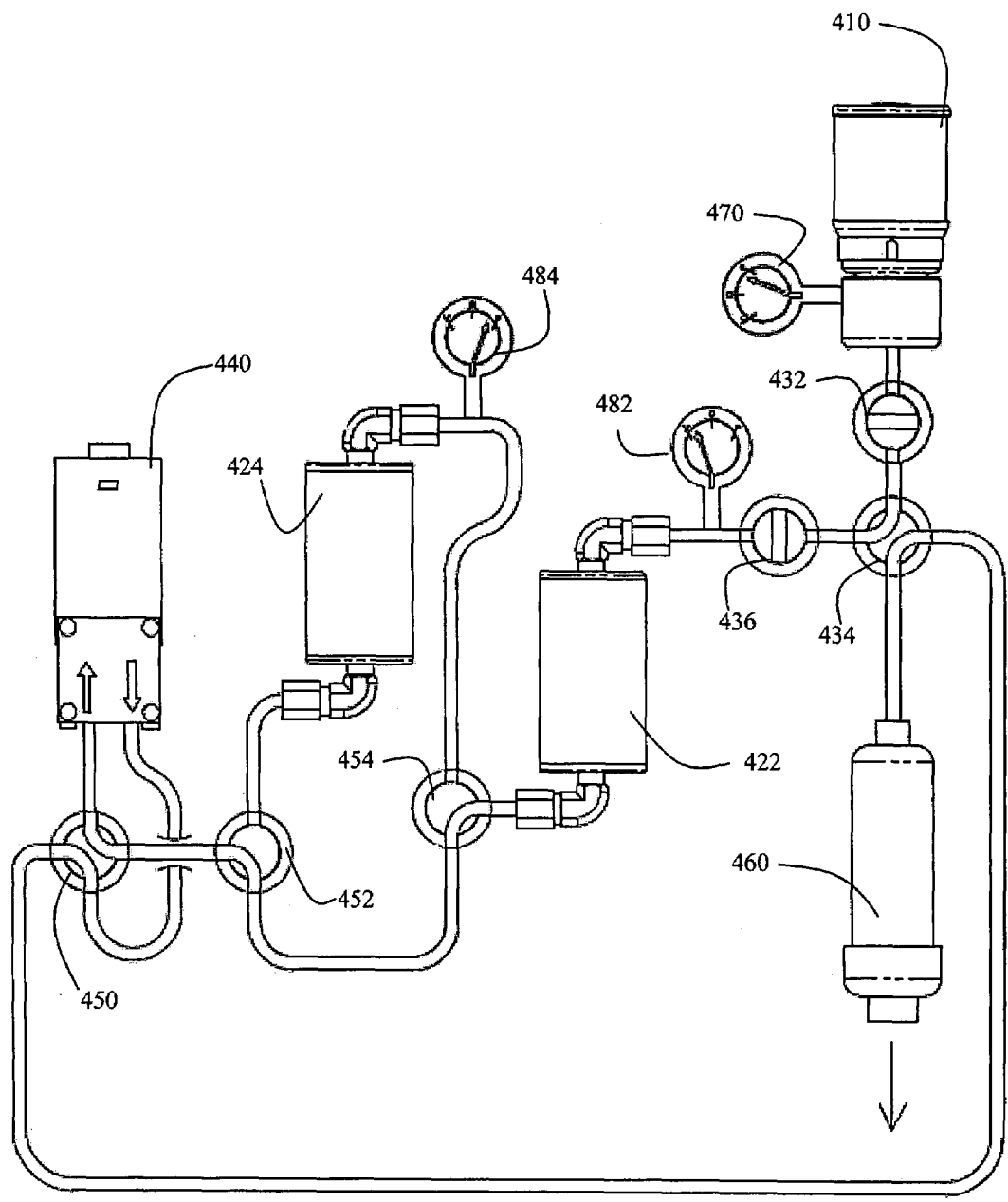

FIG. 4e schematically depicts a nitrogen (flushing) purging step directed to second zeolite chamber 422. Fluid communication between zeolite chamber 422 and oxygen-ozone cell 410 is impeded, for instance, by closing two-way valve 432, thus, the embodiment may be said to sequester oxygen under pressure (of about 11-33 psig, preferably, about 22 psig) in cell 410. Two-way valve 436 may also be closed. Also, second zeolite chamber 422 may be put into direct communication with pump 440 (and communication with first zeolite chamber 424 may not be permitted), for instance, by orienting three-way valves 452 and 454 to accomplish such a purpose. Also, the configurations of three-way valves 452 and 454 can function to sequester zeolite chamber 424. Pump 440 can be ran in the opposite direction, as schematically depicted by the orientation of four-way valve 450, so as to pull, among other contents, nitrogen from zeolite chamber 422 and pump nitrogen out, for instance, through desiccant chamber 460 into the surrounding environment as well as through any other exhaust mechanisms known to one having ordinary skill in the art. During this step, zeolite chamber 422 may have, if any contents, a mix of both oxygen and nitrogen (e.g., that may be similar to the composition of air) under vacuum conditions, for example, with a pressure of about negative 4-12 psig, preferably, about −8 psig.

Figure 4F:
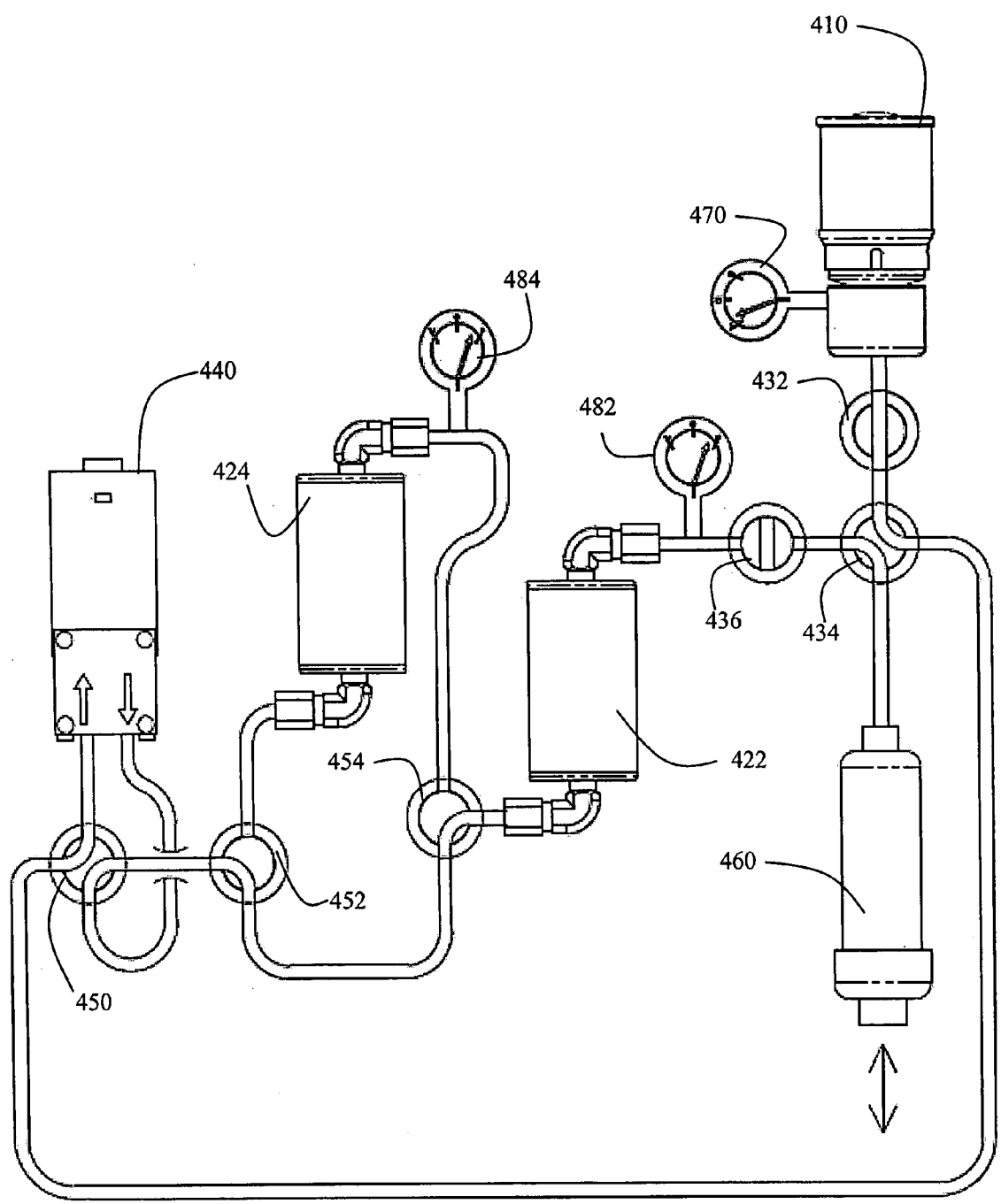

Because FIG. 4a-i depict a two pass embodiment, FIG. 4f schematically shows a step for recycling concentrated oxygen found within oxygen-ozone cell 410 in an embodiment. Pump 440 may be returned to running in the first direction as depicted by the orientation of four-way valve 450. The system as a whole may be closed where oxygen-ozone cell 410 can be configured to be in direct fluid communication with pump 440 via, for example, by opening two-way valve 432 and configured four-way valve 434 to communicate with pump 440 to the exclusion of desiccant chamber 460. Moreover, pump 440 may be put into direct communication with second zeolite chamber 422 via, for instance, three-way valves 452 and 454. As a result, concentrated oxygen may be pulled from oxygen-ozone cell 410 and ran through pump 440 and pumped into zeolite chamber 422. Thus, zeolite chamber 422 may be pressurized with the concentrated oxygen from oxygen-ozone cell and oxygen-ozone cell 410 can be under vacuum conditions of, for example, about negative 4-12 psig, preferably, about −8 psig. The oxygen in zeolite chamber 422 can be further concentrated because of the adsorption of remaining nitrogen due to the at least one zeolite of zeolite chamber 422. The further concentrated oxygen may be held under a pressure of about 7-23 psig, preferably, about 15 psig.

Figure 4G:
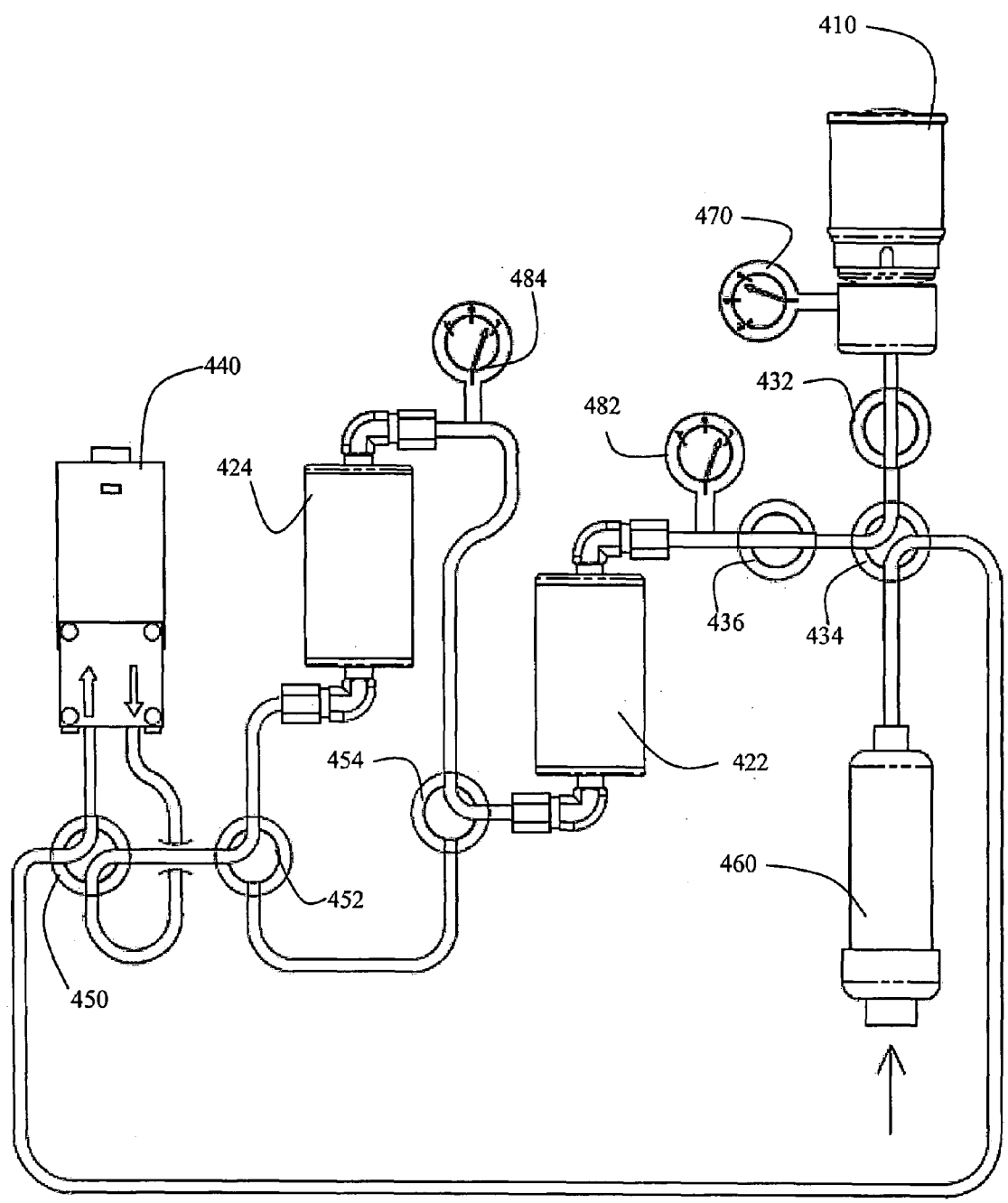

FIG. 4g depicts a configuration and step for refilling oxygen-ozone cell 410 in an embodiment of the present invention. For example, two-way valve 432, four-way valve 434 and two-way valve 436 can be configured so as to permit communication between cell 410 and zeolite chamber 422. Additionally, pump 440 can be configured to directly communicate with first zeolite chamber 424, which in turn, is configured to directly communicate with second zeolite chamber 422 via, for example, three-way valves 452 and 454, respectively. Moreover, the system is restored to an open arrangement where pump 440 pulls atmospheric/ambient air through desiccant chamber 460, which may be the result of configuring four-way valve for such a purpose. Allowing additional air into the embodiment can act to counter-balance the volume of nitrogen and oxygen purged and, thus, it may restore gas volume of this configuration/step to about the same overall volume as it would have in the configuration/step of FIG. 4d. As a result of this configuration/step, a substantial amount of the further concentrated oxygen from second zeolite chamber 422 may be forced into oxygen-ozone cell 410. Both zeolite chamber 422 and 424 as well as cell 410 may have concentrated oxygen that can be held at a pressure of between about 11-33 psig in each respective chamber, preferably, the pressure may be maintained at about 22 psig in each chamber.

Figure 4H:
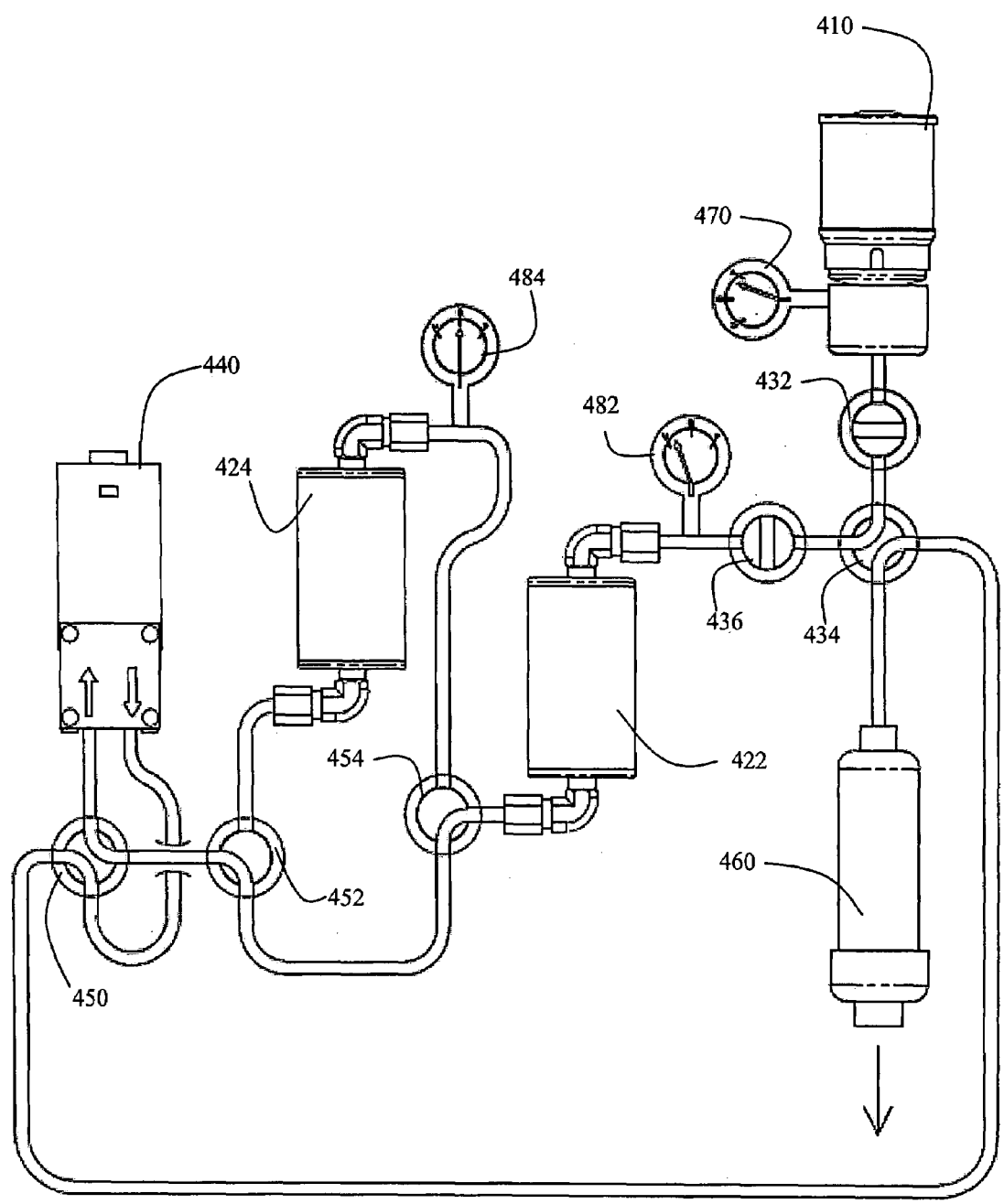

FIG. 4h schematically shows a second nitrogen purging step directed to second zeolite chamber 422, which is substantially similarly to that shown in FIG. 4e. Fluid communication between zeolite chamber 422 and oxygen-ozone cell 410 is impeded, for instance, by closing two-way valve 432, thus, the embodiment may be said to sequester oxygen under pressure (of about 11-33 psig, preferably, about 22 psig) in cell 410. Two-way valve 436 may also be closed. Also, second zeolite chamber 422 may be put into direct communication with pump 440, for instance, by orienting three-way valves 452 and 454 to accomplish such a purpose. Also, the configurations of three-way valves 452 and 454 can function to sequester zeolite chamber 424. Pump 440 can be ran in the opposite direction, as schematically depicted by the orientation of four-way valve 450, so as to pull, among other contents, nitrogen from zeolite chamber 422 and pump nitrogen out, for instance, through desiccant chamber 460 into the surrounding environment as well as through any other exhaust mechanisms known to one having ordinary skill in the art. During this step, zeolite chamber 422 may have, if any contents, a mix of both oxygen and nitrogen under vacuum conditions, for example, with a pressure of about negative 4-12 psig, preferably, about −8 psig.

Figure 4I:
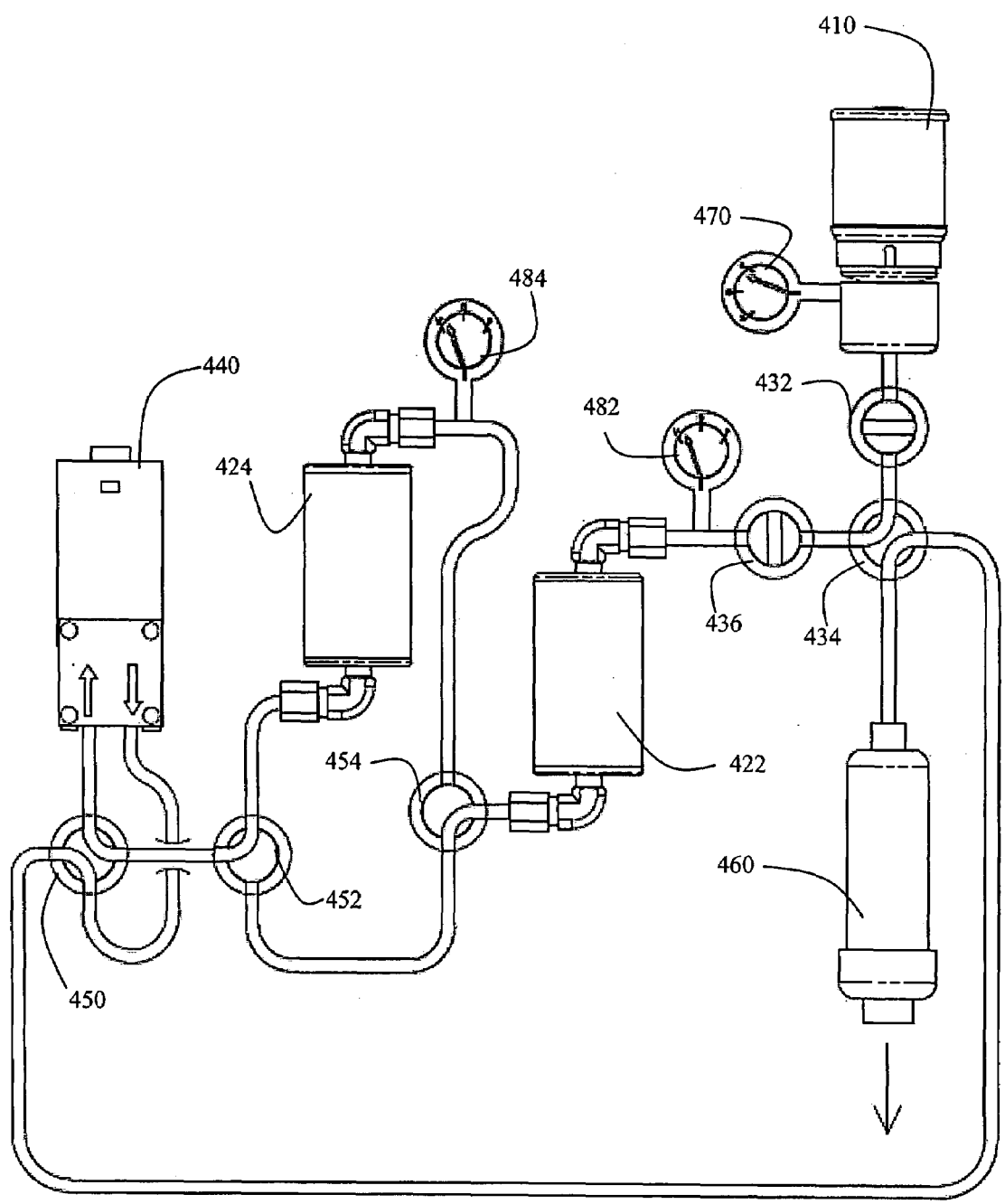

FIG. 4i shows a nitrogen purging step directed to first zeolite chamber 424. This may be accomplished by establishing fluid communication directly between pump 440 to the previously sequestered first zeolite chamber 424 to the exclusion of communication between pump 440 and second zeolite chamber 422 via, for instance, configuring three-way valves 452 and 454 for such a purpose. Thus, Pump 440 can pull, among other contents, nitrogen from zeolite chamber 422 and pump nitrogen out, for instance, through desiccant chamber 460 into the surrounding environment as well as through any other exhaust mechanisms known to one having ordinary skill in the art. Second zeolite chamber 422 may then contain, if any content, nitrogen & oxygen (e.g. similar to the composition of air) under vacuum conditions where the pressure may be between negative 4-12 psig, preferably, about −8 psig. First zeolite chamber 424 may be about atmospheric pressure. Oxygen-ozone cell 410 may be removed and the oxygen therein may be of substantial purity as to be available for ozone conversion as needed, for example, for therapeutic purposes. If another substantially empty oxygen-ozone cell replaces cell 410 after removal and pump 440 is turned off, the embodiment may be returned to initial state as shown in FIG. 4a.

Referring generally to FIGS. 5a-i, in accordance with at least one embodiment of the present invention, a system and method for providing a gaseous fluid having substantial sterility is disclosed. As one non-limiting example, the final gaseous product may contain both oxygen and ozone, for example, in a suitable concentration and suitable level of sterility for therapeutic purposes known to those having ordinary skill in the art. To potentially improve sterilization, ozone concentration may be increased during conversion and/or held at a predetermined level for a predetermined time period, then adjusted to therapeutic levels by any means known to one having ordinary skill in the art. This may be deemed by some as a validation cycle or a validated sterilization cycle that can be performed before using, for example, standard ozone inoculation methods and the like known to one having ordinary skill in the art.

Figure 5A:
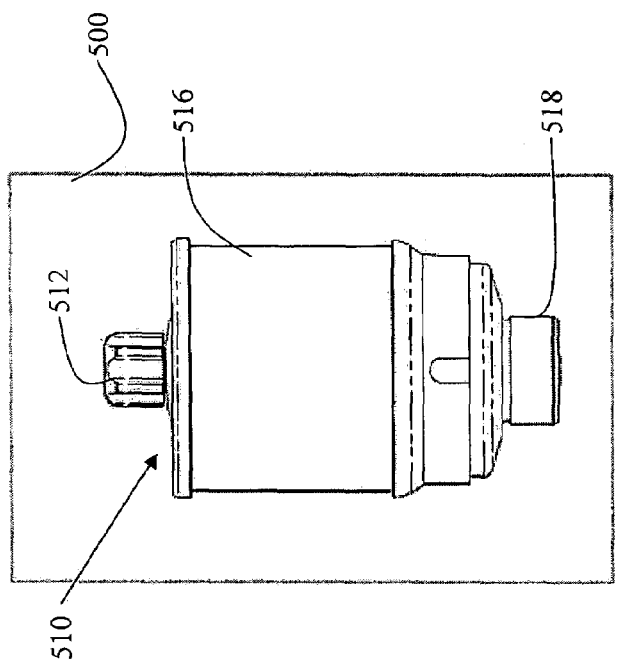

FIG. 5a shows an exemplary oxygen-ozone cell (cell chamber) within an exemplary sterile pouch. Sterile casing 500 encases oxygen-ozone cell 510, for example, to assist in providing a sterile packaging and shipping means for oxygen-ozone cell 510. Thus, the inside and outside of oxygen-ozone cell 510 may be substantially sterile while inside sterile casing 500. Oxygen-ozone cell 510 may also be provided under vacuum, for example, by previously filling with substantially pure oxygen and applying a vacuum to it. By providing oxygen-ozone cell 510 under vacuum, it may be able to be filled with oxygen and relatively shortly thereafter a portion of oxygen contained therein may be converted to ozone. Thus, oxygen does not necessarily need to be provided under pressure from an outside source such as from a supplier of medical grade oxygen. Nor does oxygen generation necessarily have to be performed at a remote location such as at a supplier's facilities. Rather, oxygen generation and ozone conversion may be performed onsite at, for example, a medical facility where ozone therapy is being administered.

Figure 5B:
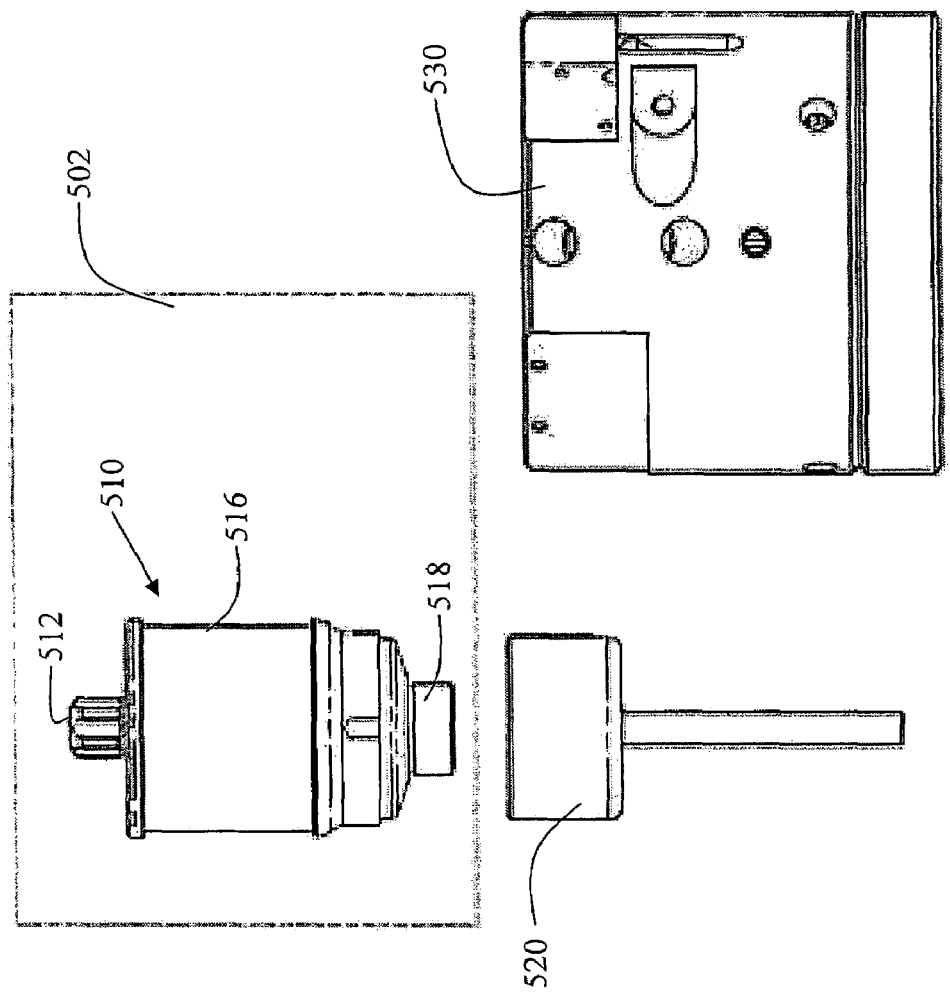
Figure 5C:
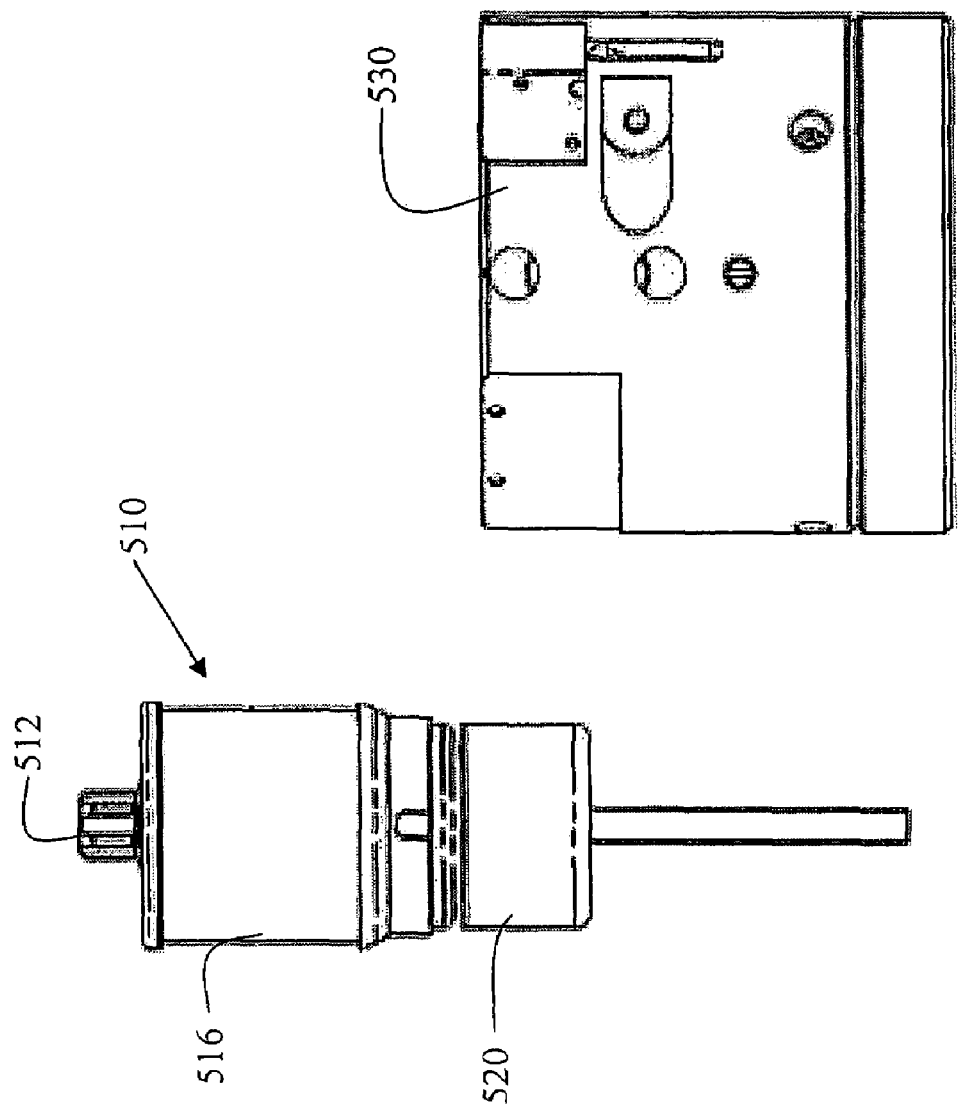
Figure 5D:
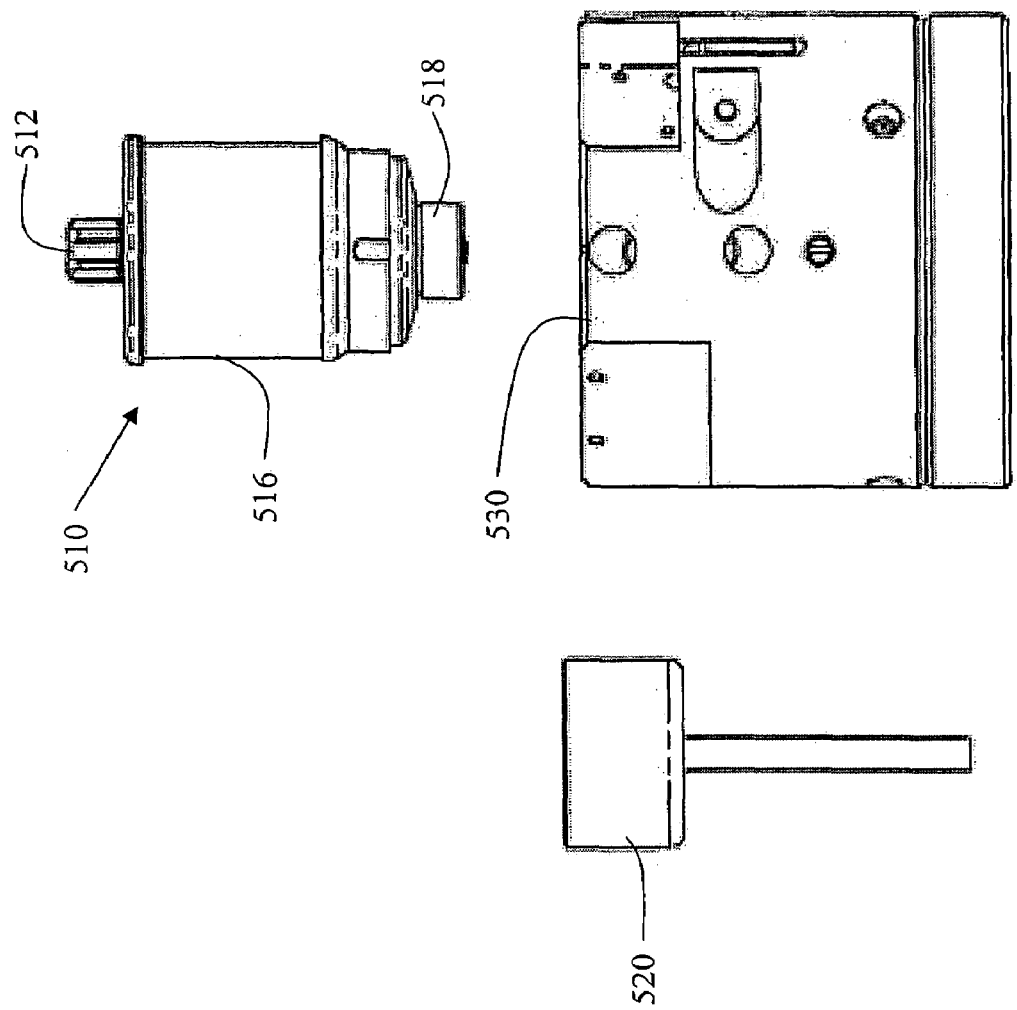
Figure 5E:
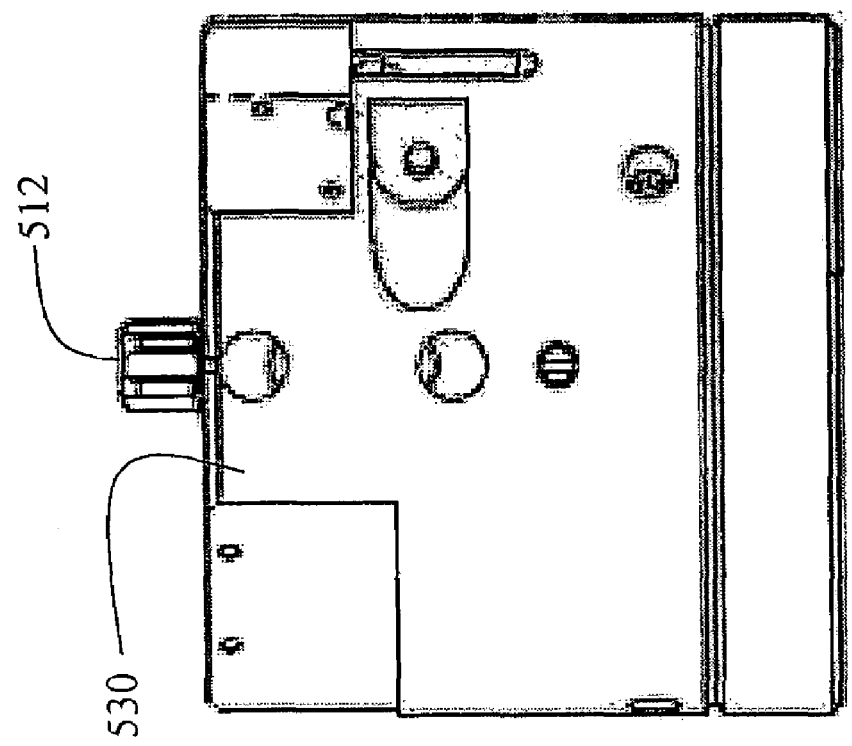
Figure 5E:
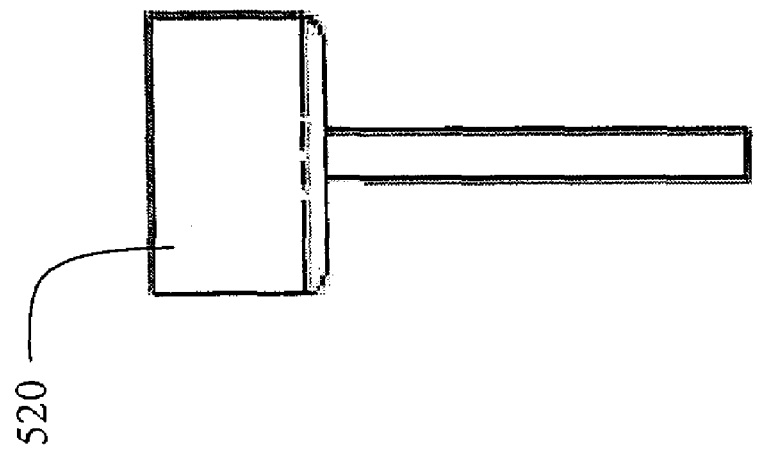

Referring again to FIG. 5a, oxygen-ozone cell 510 may have cap 512 that may be removably attachable to and substantially envelop adaptor 514 (not shown in FIG. 5a because attached and surrounded by cap 512, see, e.g., FIG. 5e for depiction of adaptor 514). Cell 510 also has inner chamber portion 516, which may house oxygen as well as ozone upon filling and charging, and cell 510 may have port 518. Port 518 may contain a one-way valve.

FIG. 5b shows an exemplary oxygen-ozone cell 510 removed from sterile casing 500. Cell 510 may continue to have substantially sterile field 502 around the outside of cell 510 and the inside of cell 510 (i.e. chamber portion 516) may also remain substantially sterile. Filler piece 520 is part of an overall system and apparatus, such as the embodiments of FIGS. 1a-4i described above, for filing oxygen-ozone cell 510 with substantially concentrated oxygen. Filler piece 520 and the system as a whole may not be kept under sterile conditions in at least one embodiment of the present invention. Ozone conversion/charger unit 530 is also depicted in FIG. 5b for converting a selected portion of oxygen within oxygen-ozone cell 510 into ozone. Unit 530 may not be under sterile conditions. Oxygen-ozone cell 510 may be placed on filler piece 520 by interaction of piece 520 with port 518, thus, fluid communication may be established.

FIG. 5c shows exemplary oxygen-ozone cell 510 engaged with filler piece 520 and, thus, in communication with a filling apparatus and system such as the embodiments of FIGS. 1a-4i described above. While engaged, chamber 516 may decrease in sterility due to fluid communication with filing apparatus and system that itself may not be sterile. Oxygen-ozone cell 510 may then be filled according to, for example, any of the methods, systems and apparatuses described in the embodiments of FIGS. 1a-4i.

Upon filling oxygen-ozone cell 510 with substantially concentrated and purified oxygen, it may be disengaged from filler piece 520 as depicted in FIG. 5d. Oxygen-ozone cell 510 may then be engaged within ozone conversion unit 530, the result of which is depicted by FIG. 5e. Once engaged, cell 510 may be charged so that a portion of oxygen reacts and forms ozone. After ozone is generated by conversion, unit 530 remains non-sterile. The outside of cell 510 including the outside of cap 512 also remain non-sterile. Nevertheless, the charging process and the formation of ozone can provide/assure substantial sterility to chamber 516 inside cell 510 and to the area and surfaces between inner surface of cap 512 and outer surface of adaptor 514 when cap 512 may be substantially encompassing adaptor 514. For example, small amounts of non-sterile zeolite dust may have been blown into the oxygen-ozone cell 510 during the oxygen concentration process. Zeolite dust may be removed using a filter or sterilized using a validated sterilization cycle where ozone concentration may be increased during conversion and/or held at a predetermined level for a predetermined time period. Validation may be achieved because cell 510 can be initially provided with substantial sterility and, thus, there is increased confidence/assurance in what types, if any, of contamination may have entered cell 510 during filling. This may then lead to establishing a validated sterilization cycle using the ozone created.

Figure 5F:
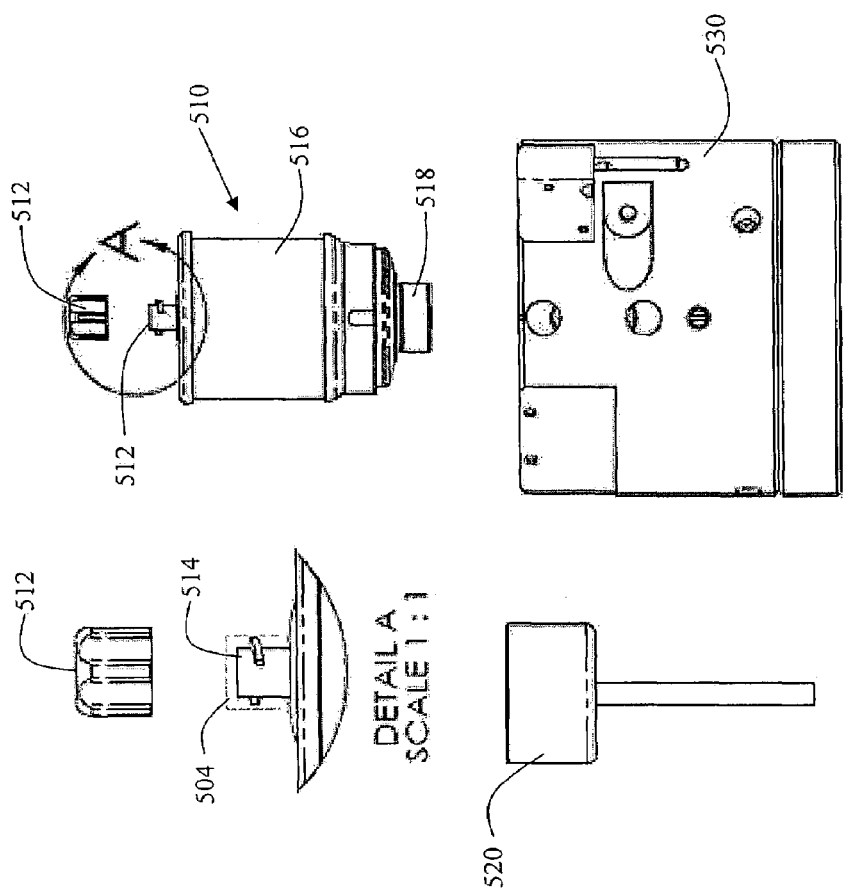

As depicted in FIG. 5f, oxygen-ozone cell 510 can be removed from ozone conversion unit 530. Also, cap 512 may be removed from adaptor 514, thus, substantially sterile field 504 may remain around adaptor 514 following removal of cap 512.

Figure 5G:
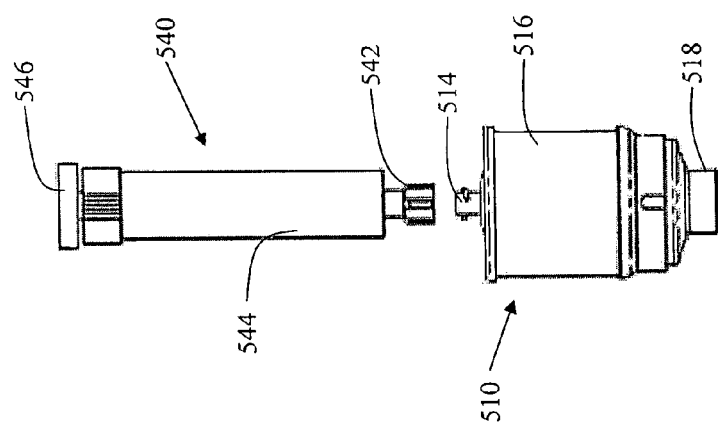
Figure 5H:
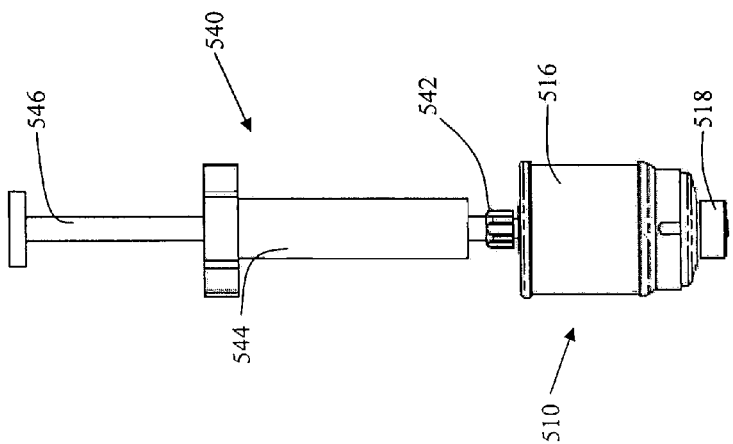

FIGS. 5g-i shows a syringe as an exemplary delivery component for therapeutic purposes as one non-limiting example that can be attached to adaptor 514 of oxygen-ozone cell 510 following the removal of cap 512. It will be understood to those having ordinary skill in the art that various delivery components may be adapted to interface with adaptor 514 and embodiments are not limited to syringes. Syringe 540 can have a substantially sterile inside cavity portion 544. Syringe 540 may also have connector 542 attached thereto, which may be similarly to cap 512 in construction, and plunger 542 operatively interfaced with the cavity of syringe 540. As shown in FIG. 5h, connector 542, when engaged with adaptor 514, may establish fluid communication between chamber 516 of cell 510 and the inside cavity of syringe 540. Since chamber 516 contains a mixture of oxygen and ozone under substantially sterile conditions and syringe 540 has been provided with a substantially sterile inside cavity portion, fluid communication of oxygen and ozone will retain substantial sterility. A portion of the oxygen-ozone mixture may be removed from syringe 540 when plunger 546 is depressed at a first state and then pulled away from the cavity of syringe 540 reaching a second state, thus creating a vacuum which effectuates the movement of oxygen-ozone mixture from chamber 516 into the cavity of syringe 540. Syringe 540 may be removed by releasing connector 542 from adaptor 514 as depicted by FIG. 5i. Thereafter, syringe 540 can contain the substantially sterile oxygen-ozone mixture for use, for example, for therapeutic applications.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of delivering a substantially sterile dose of oxygen-ozone, comprising:
   providing an oxygen-ozone cell having an inner chamber, an adapter and a cap for the adaptor;
   filling the oxygen-ozone cell with substantially concentrated oxygen concentrated from air;
   engaging the oxygen-ozone cell with a ozone conversion unit;
   generating a predetermined concentration of ozone from charging the substantially concentrated oxygen; and
   disengaging the oxygen-ozone cell from the ozone conversion unit.

2. The method of claim 1, wherein the inner chamber of the oxygen-ozone cell is provided under vacuum.

3. The method of claim 1, wherein the oxygen-ozone cell is flushed with substantially pure oxygen before being provided.

4. The method of claim 1, wherein the predetermined concentration of ozone is suitable for providing substantial sterility to the inner chamber of the oxygen-ozone cell.

5. The method of claim 4, further comprising:
   adjusting the concentration of ozone for therapeutic purposes.

6. The method of claim 1, further comprising:
   removing the cap from the adaptor; and
   interfacing the adaptor with a substantially sterile delivery component.

7. The method of claim 1, further comprising:
   detecting one or more nitrogen oxides after charging the substantially concentrated oxygen.

8. The method of claim of claim 7, wherein detecting the one or more nitrogen oxides includes detecting nitrogen dioxide molecules.

9. The method of claim 7, wherein detecting one or more nitrogen oxides is accomplished by a nitrogen oxide detector in the ozone conversion unit.

10. The method of claim 9, wherein the nitrogen oxide detector includes a light source and a photodetector.

* * * * *